(12) United States Patent
Kibler et al.

(10) Patent No.: US 11,662,747 B2
(45) Date of Patent: *May 30, 2023

(54) ARTICULATED FLUID DELIVERY SYSTEM WITH SWIVEL JOINTS RATED FOR HIGH PRESSURE AND FLOW

(71) Applicant: FHE USA LLC, Fruita, CO (US)

(72) Inventors: Matthew E. Kibler, Grand Junction, CO (US); Kyle Scholl, Dunlap, IL (US); Nicolas G. Snoke, Grand Junction, CO (US)

(73) Assignee: FHE USA LLC, Fruita, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,274

(22) Filed: Apr. 16, 2021

(65) Prior Publication Data

US 2021/0232162 A1   Jul. 29, 2021

Related U.S. Application Data

(60) Continuation of application No. 16/826,648, filed on Mar. 23, 2020, now Pat. No. 10,996,686, which is a
(Continued)

(51) Int. Cl.
*G05D 3/12* (2006.01)
*B25J 15/00* (2006.01)
(Continued)

(52) U.S. Cl.
CPC ............ *G05D 3/125* (2013.01); *B25J 13/006* (2013.01); *B25J 13/06* (2013.01); *B25J 15/0019* (2013.01); *E21B 43/2607* (2020.05)

(58) Field of Classification Search
CPC ..... G05D 3/125; E21B 43/2607; E21B 43/26; B25J 13/06; B25J 13/006; B25J 15/0019
See application file for complete search history.

(56) References Cited

U.S. PATENT DOCUMENTS 1,989,980 A   2/1935   Hamer
3,422,895 A   1/1969   Koonce
(Continued)

FOREIGN PATENT DOCUMENTS

GB           1557108         12/1979
WO      2018212773 A1      11/2018

OTHER PUBLICATIONS

Halliburton—Surface Manifold Equipment Evaluation Manual, Oct. 2010 revision, describing "Big Inch"-branded products.
(Continued)

*Primary Examiner* — Aaron L Lembo
(74) *Attorney, Agent, or Firm* — Zeman-Mullen & Ford, LLP

(57) ABSTRACT

An articulated fluid delivery unit (FDU) is disposed to deliver fluid remotely to, for example, a mating fluid connection housing assembly provided on a wellhead. Flow iron on the FDU preferably includes at least one swivel joint rated for high fluid pressure and high fluid volume flow. More preferably, the swivel joint has an internal diameter of not less than about 5 inches and is further capable of rotation while retaining an internal pressure of not less than about 10,000 psi.

30 Claims, 18 Drawing Sheets

Related U.S. Application Data division of application No. 16/673,460, filed on Nov. 4, 2019, now Pat. No. 10,996,685, which is a continuation of application No. 16/406,927, filed on May 8, 2019, now Pat. No. 10,466,719, which is a continuation-in-part of application No. 16/221,279, filed on Dec. 14, 2018, now Pat. No. 10,550,659, which is a continuation-in-part of application No. 16/037,687, filed on Jul. 17, 2018, now abandoned.

(60) Provisional application No. 62/811,595, filed on Feb. 28, 2019, provisional application No. 62/734,749, filed on Sep. 21, 2018, provisional application No. 62/649,008, filed on Mar. 28, 2018.

(51) Int. Cl.
*B25J 13/00* (2006.01)
*B25J 13/06* (2006.01)
*E21B 43/26* (2006.01)

(56) References Cited

U.S. PATENT DOCUMENTS

| | | | |
|---|---|---|---|
| 3,727,950 A * | 4/1973 | Swanson | F16L 27/0828 277/928 |
| 3,799,589 A | 3/1974 | Boelkins | |
| 3,973,747 A | 8/1976 | Jagerstrom | |
| 3,997,198 A * | 12/1976 | Linder | F16L 27/0832 285/98 |
| 4,211,281 A | 7/1980 | Lawson | |
| 4,215,907 A | 8/1980 | Pohl | |
| 4,236,737 A * | 12/1980 | Herbert | F16L 27/082 464/89 |
| 4,391,297 A | 7/1983 | Knight | |
| 4,457,338 A | 7/1984 | Moller et al. | |
| 4,474,213 A | 10/1984 | Jameson | |
| 4,500,119 A | 2/1985 | Geberth, Jr. | |
| 4,502,505 A | 3/1985 | Moller | |
| 4,548,236 A | 10/1985 | Bloomquist | |
| 4,557,509 A * | 12/1985 | Giebeler | F16L 37/138 285/98 |
| 4,570,673 A | 2/1986 | Kendrick et al. | |
| 4,619,369 A | 10/1986 | Mertens | |
| 4,828,033 A | 5/1989 | Prison | |
| 5,045,034 A | 9/1991 | Almeda, Jr. | |
| 5,045,217 A | 9/1991 | Ronan et al. | |
| 6,003,907 A | 12/1999 | Gau et al. | |
| 6,065,565 A | 5/2000 | Puszkiewicz et al. | |
| 6,202,013 B1 | 3/2001 | Anderson et al. | |
| 6,375,432 B1 | 4/2002 | Krasny et al. | |
| 6,386,595 B1 * | 5/2002 | Peppel | F16L 27/0812 285/98 |
| 6,405,114 B1 | 6/2002 | Priestley et al. | |
| 6,516,917 B1 | 2/2003 | Mayer et al. | |
| 6,581,974 B1 | 6/2003 | Ragner et al. | |
| 6,595,555 B2 | 7/2003 | Ungchusri et al. | |
| 6,701,980 B2 | 3/2004 | Rothrock | |
| 6,739,804 B1 | 5/2004 | Haun | |
| 6,808,025 B2 | 10/2004 | Bissen et al. | |
| 6,840,540 B2 | 1/2005 | Fugel | |
| 6,862,509 B2 | 3/2005 | Rau et al. | |
| 6,883,532 B2 | 4/2005 | Rau | |
| 7,011,108 B2 | 3/2006 | Benckert et al. | |
| 7,012,540 B2 | 3/2006 | Petzold et al. | |
| 7,025,391 B2 | 4/2006 | Shu | |
| 7,111,689 B2 | 9/2006 | Wise et al. | |
| 7,204,525 B2 | 4/2007 | Matzner | |
| RE39,695 E | 6/2007 | Ungchusri et al. | |
| 7,474,969 B2 | 1/2009 | Poulisse | |
| 7,635,254 B2 | 12/2009 | Kunz et al. | |
| 7,657,355 B2 | 2/2010 | Rau et al. | |
| 7,735,880 B2 | 6/2010 | Ohlsson | |
| 7,784,354 B2 | 8/2010 | Gelies | |
| 7,844,379 B2 | 11/2010 | Tang et al. | |
| 7,909,059 B2 | 3/2011 | Wehner et al. | |
| 8,146,665 B2 | 4/2012 | Neal | |
| 8,151,885 B2 | 4/2012 | Bull | |
| 8,166,727 B2 | 5/2012 | Pivac et al. | |
| 8,281,811 B2 | 10/2012 | Rau | |
| 8,474,521 B2 | 7/2013 | Kajaria et al. | |
| 8,496,062 B2 | 7/2013 | Kajaria | |
| 8,590,556 B2 | 11/2013 | Kendrick | |
| 8,622,099 B2 | 1/2014 | Liem et al. | |
| 8,656,990 B2 | 2/2014 | Kajaria et al. | |
| 8,783,733 B2 | 7/2014 | Tausch | |
| 8,813,836 B2 | 8/2014 | Kajaria et al. | |
| 8,899,268 B2 | 12/2014 | Garner et al. | |
| 8,905,056 B2 | 12/2014 | Kendrick | |
| 8,915,310 B2 | 12/2014 | Flusche | |
| 9,004,104 B2 | 4/2015 | Ungchusri et al. | |
| 9,127,545 B2 | 9/2015 | Kajaria et al. | |
| 9,239,125 B2 | 1/2016 | Ungchusri et al. | |
| 9,341,055 B2 | 5/2016 | Weightman et al. | |
| 9,341,056 B2 | 5/2016 | Weightman et al. | |
| 9,394,707 B2 | 7/2016 | Yi et al. | |
| 9,404,619 B2 | 8/2016 | Liem et al. | |
| 9,447,921 B2 | 9/2016 | Liem et al. | |
| 9,518,430 B2 | 12/2016 | Guidry | |
| 9,523,443 B2 | 12/2016 | Ferrar | |
| 9,534,604 B2 | 1/2017 | Lopez et al. | |
| 9,568,138 B2 | 2/2017 | Arizpe | |
| 9,605,525 B2 | 3/2017 | Kajaria et al. | |
| 9,890,602 B2 | 2/2018 | Guttormsen et al. | |
| 9,995,102 B2 | 6/2018 | Dille et al. | |
| 10,077,619 B2 | 9/2018 | Bjornenak | |
| 10,082,230 B2 | 9/2018 | Dieduksman et al. | |
| 10,119,380 B2 | 11/2018 | Joseph | |
| 10,190,268 B2 | 1/2019 | Pietila et al. | |
| 10,527,183 B1 | 1/2020 | Hill | |
| 10,662,749 B1 | 5/2020 | Hill | |
| 10,774,965 B1 * | 9/2020 | Travis | F16L 23/036 |
| 10,808,871 B2 | 10/2020 | Nguyen | |
| 11,306,835 B1 | 4/2022 | Dille | |
| 2004/0076503 A1 | 4/2004 | Rau et al. | |
| 2006/0131873 A1 * | 6/2006 | Klingbail | F16L 27/0812 285/147.1 |
| 2007/0029090 A1 | 2/2007 | Andreychuk et al. | |
| 2010/0038900 A1 | 2/2010 | Frapp | |
| 2011/0030963 A1 | 2/2011 | Demong et al. | |
| 2014/0077492 A1 | 3/2014 | Kendrick | |
| 2014/0103698 A1 | 4/2014 | Feng | |
| 2015/0100066 A1 | 4/2015 | Kostrzewski et al. | |
| 2015/0225970 A1 | 8/2015 | Westermann et al. | |
| 2015/0226355 A1 | 8/2015 | Ungchusri et al. | |
| 2015/0345272 A1 | 12/2015 | Kajaria et al. | |
| 2016/0201408 A1 | 7/2016 | Little et al. | |
| 2017/0022764 A1 | 1/2017 | Backer et al. | |
| 2017/0074442 A1 | 3/2017 | Gennasio et al. | |
| 2017/0115674 A1 | 4/2017 | Lopez et al. | |
| 2017/0123437 A1 | 5/2017 | Boyd et al. | |
| 2017/0146189 A1 | 5/2017 | Herman et al. | |
| 2017/0159654 A1 | 6/2017 | Kendrick | |
| 2017/0314379 A1 | 11/2017 | Guidry | |
| 2018/0003323 A1 | 1/2018 | Kendrick | |
| 2018/0187662 A1 * | 7/2018 | Hill | F04B 15/02 |
| 2018/0347286 A1 | 12/2018 | Scott et al. | |
| 2020/0048918 A1 | 2/2020 | Diebold et al. | |
| 2020/0048919 A1 * | 2/2020 | Diebold | B66C 13/20 |
| 2020/0109804 A1 * | 4/2020 | Nguyen | E21B 43/26 |

OTHER PUBLICATIONS

Online article entitled "It's a Material World" dated Dec. 12, 2012 by Le Yu, published by Power & Motion at https://www.powermotiontech.com/technologies/fittings-couplings/article/21885071/its-a-material-world.

Information Disclosure Statement filed in U.S. Appl. No. 14/086,546, filed Nov. 21, 2013 (inventor William D. Kendrick, application published as U.S. 2014/0077492); see NPL item No. 2.

(56) References Cited

OTHER PUBLICATIONS

Information Disclosure Statement filed in U.S. Appl. No. 15/707,544, filed Sep. 18, 2017 (inventor William D. Kendrick, application now U.S. Pat. No. 10,920,520); see NPL item No. 2.
Information Disclosure Statement filed in U.S. Appl. No. 13/041,656, filed May 2, 2011 (inventor William D. Kendrick, application now U.S. Pat. No. 8,590,556); see NPL item No. 2.
Office Action in Applicant's co-pending case: U.S. Appl. No. 16/898,135, filed Jun. 10, 2020 entitled "Fluid-Bearing Pipe Fittings Enhancing Fluid Delivery System Performance"; Office Action emailed out by Office dated Dec. 12, 2022.
NSK Ltd. Catalog, "Cylindrical Roller Bearings". http://www nsk.com/products/rollerbearing/cylindrical/index.html#Circa 2018.
Schaeffler Technologies GMBH & Co. Catalog, "High Precision Bearings for Printing Machinery". http://www.schaeffler.de/remotemedien/media/_shared_media/08_media_library/01_publications/schaeffler_2/tpi/downloads_8/tpi_222_de_en.pdf, circa 2014.
Certainteed Catalog, Certa-Lok Yelomine, Restrained Joint PVC Pressure Piping System, circa 2008.
Chiksan Catalog, Chiksan Original Swivel Joints, circa 1997.
Halliburton Wellhead Connection Unit Flyer, circa 2013.
Putzmeister Catalog, "Placing Systems", from website as of Nov. 7, 2018.
Photograph showing general state of conventional fracking fluid delivery (source and date unknown).
International Search Report and The Written Opinion of the International Searching Authority in PCT/US2019/052248 dated Oct. 17, 2019 (6 pages).
DMS Technologies Quick Connect System brochure; date of publication unclear; disclosure appears to be related to US Published Patent Application 2018/0347286 cited above.

* cited by examiner

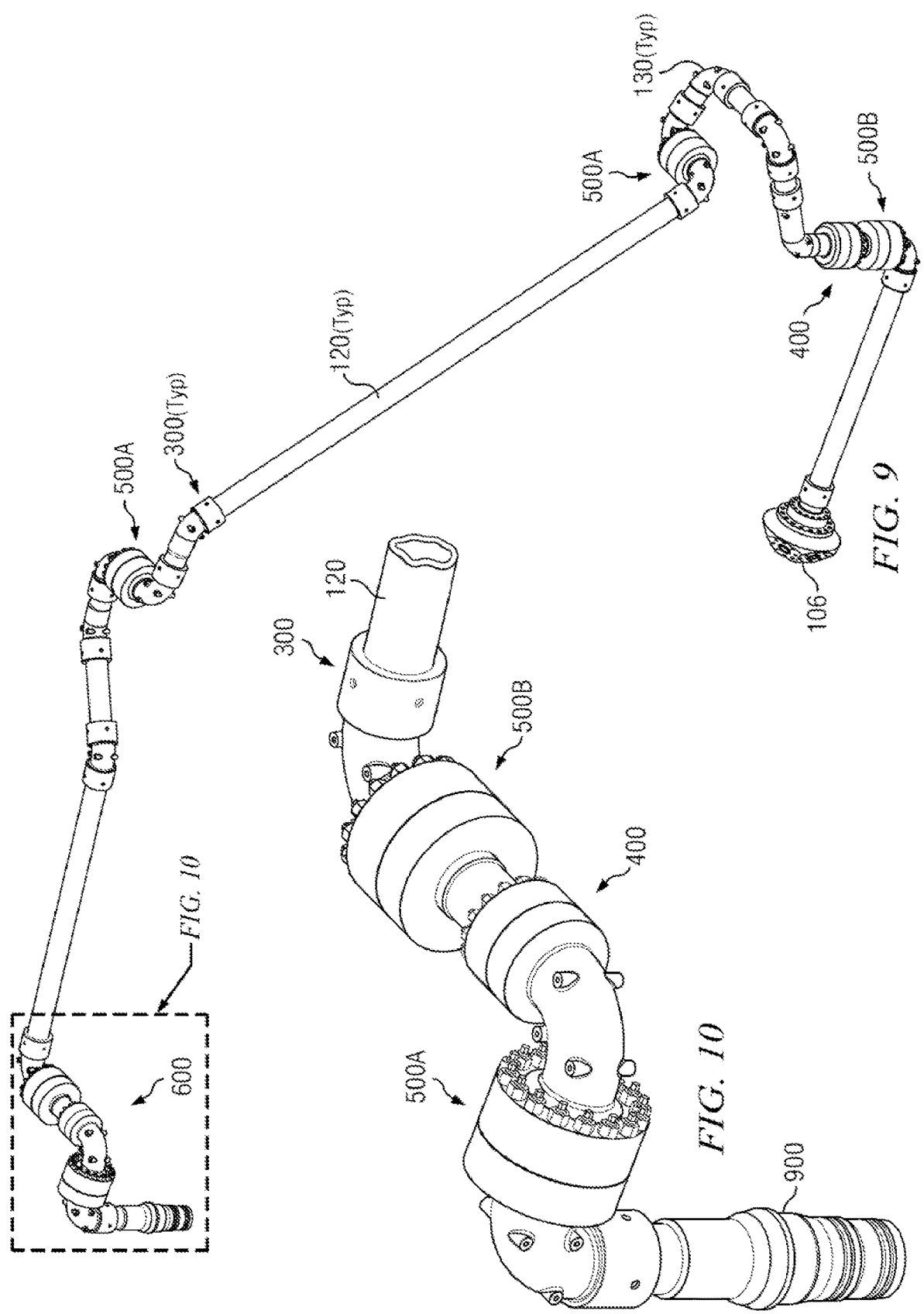

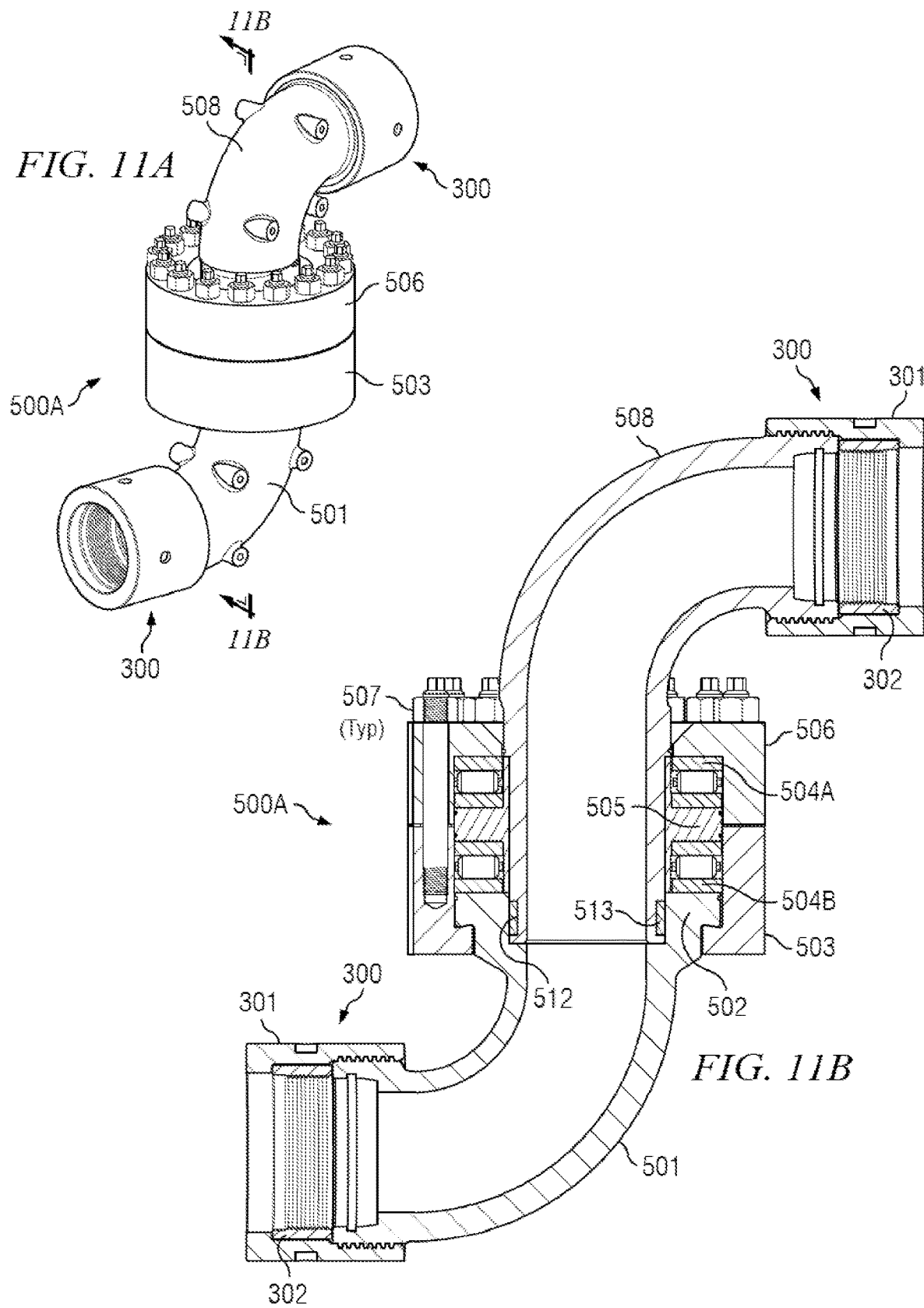

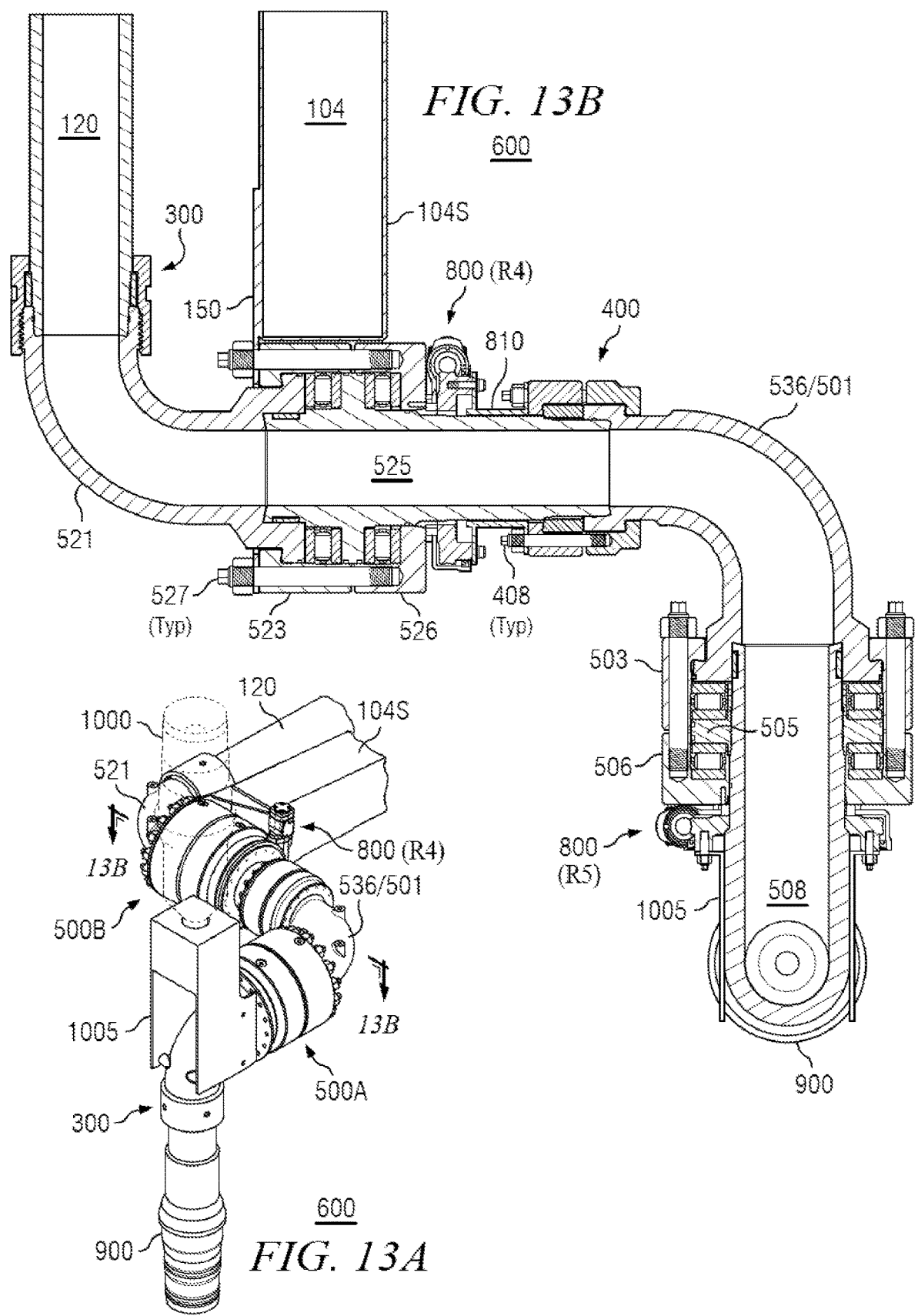

ARTICULATED FLUID DELIVERY SYSTEM WITH SWIVEL JOINTS RATED FOR HIGH PRESSURE AND FLOW

RELATED APPLICATIONS AND PRIORITY CLAIMS

This application is a continuation of co-pending, commonly-invented and commonly-owned U.S. Nonprovisional patent application Ser. No. 16/826,648 filed Mar. 23, 2020, which is a divisional application of co-pending, commonly-invented and commonly-owned U.S. Nonprovisional patent application Ser. No. 16/673,460 filed Nov. 4, 2019, which is a continuation of commonly-invented and commonly-owned U.S. Nonprovisional patent application Ser. No. 16/406,927 filed May 8, 2019, now U.S. Pat. No. 10,466,719 issued Nov. 5, 2019. Ser. No. 16/406,927 claims the benefit of and priority to the following two (2) commonly-owned U.S. Provisional Patent Applications: (1) Ser. No. 62/734,749, filed Sep. 21, 2018; and (2) Ser. No. 62/811,595, filed Feb. 28, 2019. Ser. No. 16/406,927 is also a continuation-in-part of each of the following two (2) commonly-owned U.S. Nonprovisional Patent Applications: (1) Ser. No. 16/037,687 filed Jul. 17, 2018, now abandoned, which claims the benefit of and priority to U.S. Provisional Patent Application Ser. No. 62/649,008, filed Mar. 28, 2018; and (2) Ser. No. 16/221,279 filed Dec. 14, 2018, now U.S. Pat. No. 10,550,659 issued Feb. 4, 2020, which also claims the benefit of and priority to U.S. Provisional Patent Application Ser. No. 62/649,008, filed Mar. 28, 2018. The disclosures of the following eight (8) commonly-owned U.S. Provisional and Nonprovisional Patent Applications are further incorporated herein by reference in their entirety: (1) Ser. No. 16/826,648 filed Mar. 23, 2020; (2) Ser. No. 16/673,460, filed Nov. 4, 2019; (3) Ser. No. 16/406,927, filed May 8, 2019; (4) Ser. No. 62/649,008, filed Mar. 28, 2018; (5) Ser. No. 62/734,749, filed Sep. 21, 2018. (6) Ser. No. 62/811,595, filed Feb. 28, 2019; (7) Ser. No. 16/037,687, filed Jul. 17, 2018; and (8) Ser. No. 16/221,279, filed Dec. 14, 2018.

FIELD OF THE DISCLOSURE

This disclosure relates to the field of fluid delivery, advantageously at high volumes and pressures, from surface-deployed equipment to wells drilled through subsurface formations. More particularly, in some embodiments, this disclosure relates to such fluid delivery to each of a plurality of wells having surface locations proximate each other via a remote controlled delivery system.

BACKGROUND

Wells drilled through subsurface formations are used for, among other purposes, extracting useful fluids such as oil and gas. Some subsurface formations are treated ("stimulated") by pumping fluid under pressure into such formations for the purpose of creating, propagating and propping open networks of fractures to enhance extraction of oil and gas. This technique is commonly known as "fracking". It is known in the art to drill wells for fracking substantially along the geologic trajectory of certain subsurface formations, while drilling a plurality of such "directional" or "lateral" wells from proximate surface locations. U.S. Patent Application Publication No. 2011/0030963 filed by Demong et al. ("Demong") discloses an exemplary arrangement of wells having proximate surface locations. Demong also describes controlled fluid pumping and valve equipment enabling selective opening of one or more wells to (1) fracking fluid delivery into selected wells or (2) flow from the subsurface formation to the surface.

Demong's background disclosure provides a useful general discussion of at least some aspects of the state of the current art. Demong's background is also applicable background to the technology described in this disclosure. The following background discussion includes adaptations of Demong's background disclosure where applicable to this disclosure.

During typical fracking operations, fluid is pumped into the formation at pressures that exceed the fracture pressure of the formations. The fractures in the formation thus opened up may be held open by pumping of material (proppant) that supports the fracture structurally after the fluid pressure on the formation is relieved. Other fluid treatments may include, for example, pumping acid into the wellbore to dissolve certain minerals present in the pore spaces of the formations that reduce the formation permeability.

Wellbores may be drilled into hydrocarbon-bearing formations along directed trajectories that may deviate from vertical. In land-based fracking deployments, such deviated wellbores may be drilled, for example, so that the surface locations of the wellbores are closely spaced on a relatively small land area called a "pad", while the lowermost portions of the wellbore extend laterally from the respective surface locations in a selected drainage pattern. Such arrangement reduces or minimizes the amount of land surface affected by the fracking operations.

Conventionally, fracking operations on multiple wells drilled from a common surface pad typically require multiple connections and disconnections in order to (1) connect the pumping equipment hydraulically to one well, (2) pump the fluid, then (3) disconnect the pumping equipment from the well before another well can be fluid treated. Such conventional piping configurations often involve laying pipe from each fracking fluid delivery truck to a central collection manifold and then in single or multiple lines to the well being treated. The result is that a costly separate rig-up and rig down is required for every fracture treatment. Such operations can create, among other exposures, safety risks to personnel working on or near the pad or platform, and interference with the operation of wellbores that are producing oil and/or gas while the fluid treatment equipment is connected and disconnected from various wellbores on the pad or platform. Such connection and disconnection operations may also take considerable amounts of time to perform.

FIG. 1 illustrates "zipper fracking", a conventional (prior art) approach to optimizing the multiple pipe connections described immediately above. On FIG. 1, pumping units 10 deliver fluid at pressure into manifold M1. Pumping units 10 may be conventional fracking pump and delivery trucks such as illustrated on FIG. 1. Manifold M1 may be known colloquially as a "missile" in some embodiments. Fluid transfer lines 20 on FIG. 1 deliver fluid from manifold M1 to manifold M2. Manifold M2 may be known colloquially as a "zipper frack" in some embodiments. Manifold M2 provides a plurality of control outputs 30. Control outputs 30 are each connected by one or more fluid delivery pipes to a "goat head" style manifold 40 atop a wellhead W. In oilfield fracking and well completion parlance, "goat head" refers to a style of manifold with a hollow body providing multiple fluid line connection points (e.g. flange faces).

Fluid delivery to wellheads W on FIG. 1 is controlled by actuation of control valves on control outputs 30. Advantageously, flow through each fluid delivery pipe connecting a control output 30 to a corresponding goat head 40 is independently controlled by a separate control valve. In this way, an operator may actuate different control valves at different times to deliver fluid from manifold M2 to selected wellheads W as desired.

The drawbacks of "zipper fracking" according to FIG. 1 include that the setup is very inefficient in use of hardware such as control outputs 30 and corresponding control valves. The setup of FIG. 1 calls for considerable hardware spending its time idle. Likewise, the labor required for setup and teardown is high, since each control output 30 requires multiple fluid delivery pipes to be physically connected and then disconnected from a goat head 40.

FIG. 2 illustrates another conventional (prior art) approach to delivering fracking fluid to a wellhead. Crane truck CT is positioned nearby a wellhead W into which fluid is desired to be delivered. Crane C on crane truck CT advantageously provides telescoping boom TB. As shown on FIG. 2, crane C and telescoping boom TB bring wellhead connector WC nearby wellhead W. A first operator, also nearby wellhead W, then manhandles wellhead connector WC onto wellhead W as wellhead connector WC hangs suspended from telescoping boom TB. Meanwhile, a second operator (not illustrated on FIG. 2) assists by making adjustments to the suspended position of wellhead connector WC via operation of crane C and telescoping boom TB.

Once the first operator has secured wellhead connector WC to wellhead W, piping P on crane truck CT may be connected to fracking fluid at operating pressures and delivery volumes. Fluid delivery to wellhead W may commence.

At the completion of fluid delivery, fluid flow through piping P is terminated, and the first operator may disconnect wellhead connector WC from wellhead W. The second operator then actuates crane C and telescoping boom TB to move wellhead connector WC towards a second wellhead W in range to be connected in the same manner as the first. Alternatively, the second operator moves wellhead connector WC onto crane truck CT with crane C. Crane truck CT may then be physically relocated to a position nearby a new wellhead W to be serviced.

There are several drawbacks to prior art fluid delivery according to FIG. 2. There are operator safety issues, particularly with the first operator required to manhandle wellhead connector WC onto wellhead W. The operation also optimally requires two operators. The operators must be skilled. Depending on local conditions and the skill level of the operators, manual connection of wellhead connector WC onto wellhead may be slow and imprecise. It is also likely that only a small number of wellheads W will be in range of crane truck CT without need for physically relocating crane truck CT.

There is therefore a need in the art for an improved fluid connection and delivery system for multiple wellheads that can reduce the amount of and complexity of conduit between fluid apparatus and selected wellheads in a multiple well system. Such an improved fluid delivery system will advantageously reduce risks to operating personnel safety. Embodiments of such an improved fluid delivery system will further optimize fluid delivery in high-pressure, high-volume fracking operations. Such optimizations will advantageously include automated and robotic control over spatial positioning of the fluid delivery system with respect to wellheads to be serviced.

SUMMARY AND TECHNICAL ADVANTAGES

These and other needs in the prior art are addressed by a fluid delivery system including an articulated fluid delivery unit (FDU) comprising, in preferred embodiments, a first boom section concatenated in articulated fashion to a turret, and a second boom section concatenated in articulated fashion to the first boom section. The turret rotates about a generally vertical axis. A stinger assembly is provided at a distal end of the second boom section. The stinger assembly includes a fluid connection adapter for connection to a mating fluid connection housing assembly provided on a wellhead. The stinger assembly includes rotating connections allowing independent rotation (or tilting) of the fluid connection adapter. In preferred embodiments, the stinger assembly provides two (2) such rotating connections configured to rotate in orthogonal planes.

Control over spatial positioning of the FDU is enabled by rotational control at multiple axes of rotation at corresponding articulating or rotating connections on board the FDU. In preferred embodiments, there are five (5) independently-controlled axes of rotation: turret, first boom section to turret, second boom section to first boom section, stinger assembly to second boom section and second orthogonal rotation at stinger assembly. Independent control of rotation at each of these axes allows an operator to establish a measured directional bearing at each axis, such that a set of values for all directional bearings at a given time defines the FDU's current spatial position. In preferred embodiments, the FDU may "learn" a desired spatial position (e.g., with the fluid connection adapter positioned immediately above a desired wellhead) by storing the set of directional bearings values corresponding to that spatial position. The FDU may then return to that spatial position robotically in the future when instructed to recall and take up again the corresponding set of directional bearings values. [The term "robotic" or "robotically" as used in this disclosure is intended to mean, consistent with plain English usage, that the FDU takes action as a machine capable of carrying out a series of actions by itself, responsive to instructions from a source such as a software routine].

In preferred embodiments, control over FDU's spatial position is by remote control. In such embodiments, a user directs movement of the FDU via a wirelessly-connected hand-held controller. In some embodiments, the controller may also store and recall sets of directional bearings values corresponding to spatial positions that the user directs the FDU to "learn".

In preferred embodiments, the FDU delivers fluid to its destination via fluid-bearing piping and fittings connected to articulating or rotating components such as the turret, the first and second boom sections and the stinger assembly. The fluid-bearing piping and fittings include a fluid inlet, a plurality of swivel joints and a fluid connection adapter all in fluid flow communication. The swivel joints facilitate FDU articulation and rotation. Currently preferred embodiments of the FDU are designed for fracking fluid delivery service, in which the FDU is asked to deliver fracking fluid at operating pressures of not less than about 7,500 psi ("ksi"), and more preferably not less than about 10,000 psi ("10 ksi"), and yet more preferably not less than about 15,000 psi ("15 ksi"), all at delivery volumes requiring a 7" or 8" internal diameter ("ID") pipe. As described in more detail in this disclosure, designing a serviceable 7"-8" ID swivel joint rated for 15 ksi working pressure has proved challenging. Commercially-available swivel joints rated for 15 ksi service are typically available in sizes up to 4" ID only and will not deliver the volume of fluid required for fracking operations. Larger ID commercially-available swivel joints have proven unable to withstand the tensile stresses imparted by 15 ksi working pressure. Thus, in preferred embodiments, each swivel joint has an internal diameter of not less than about 7 inches. Further, each swivel joint is preferably capable of retaining an internal pressure of not less than about 7,500 psi ("7.5 ksi"), and more preferably capable of rotation while retaining an internal pressure of not less than about 7.5 ksi. More preferably, each swivel joint is preferably capable of retaining an internal pressure of not less than about 10,000 psi ("10 ksi"), and more preferably capable of rotation while retaining an internal pressure of not less than about 10 ksi. Yet more preferably, each swivel joint is capable of retaining an internal pressure of not less than about 15 ksi, and more preferably capable of rotation while retaining an internal pressure of not less than about 15 ksi.

FDU embodiments according to this disclosure include two swivel joint embodiments whose designs have been specifically engineered and tested to withstand internal working pressures of 15 ksi with ID at least 7". Significant effort and investment has been made to solve a problem and meet a need in this regard that the prior art appeared neither to recognize or address. As described in more detail further below, the disclosure of commonly-assigned U.S. Provisional Patent Application Ser. No. 62/811,595, filed Feb. 28, 2019, incorporated herein by reference, describes at least one previous swivel joint design that was engineered, tested and then rejected as unable to withstand an internal working pressure of 15 ksi with an ID of at least 7". Rejection of this previous design was a precursor to designing the swivel joint embodiments disclosed herein.

It is therefore a technical advantage of the disclosed fluid delivery system to deliver fluid to a desired delivery destination (such as a wellhead) quickly, efficiently, safely and precisely. Once the FDU has been physically positioned in a desired jobsite location, FDU embodiments including stored and recalled spatial positioning allow repeated deliveries to wellheads whose spatial position the FDU has "learned". The FDU can further make quick, safe and precise and safe returns to wellheads that have previously received fluid.

A further technical advantage of the disclosed fluid delivery system is that in some embodiments, a first inclinometer is provided on the FDU superstructure or chassis. This first inclinometer may measure, quantitatively, the degree to which the FDU stands "out of level" in its current jobsite position. In FDU embodiments including stored and recalled spatial positioning, "out of level" information from the first inclinometer may correct sets of directional bearings data measured at axes of rotation.

A further technical advantage of the disclosed fluid delivery system is that in some embodiments, a second inclinometer is provided on the stinger assembly to maintain the fluid connection adapter in a constant plumb vertical attitude during motion of the FDU. This second inclinometer may measure, quantitatively, the degree to which the fluid connection adapter is currently "out of plumb vertical" during other motion of the FDU. In some FDU embodiments, "out of plumb vertical" information from the second inclinometer may direct the FDU to make automated adjustments to maintain the fluid connection adapter in a constant plumb vertical attitude regardless of the current motion of other FDU components. This feature facilitates, for example, entry of the fluid connection adapter into the fluid connection housing assembly at the wellhead.

A further technical advantage of the disclosed fluid delivery system is that it may be remotely operable in preferred embodiments.

A further technical advantage of the disclosed fluid delivery system is that it embodiments include swivel joints specifically designed for the high operating pressures and fluid flow volumes demanded by fracturing fluid delivery service.

A further technical advantage of the disclosed fluid delivery system is that, in currently preferred embodiments, fluid-bearing piping and fittings include swivel joint embodiments rated for fracking fluid delivery working pressures and delivery volumes. Swivel joint embodiments disclosed herein also allow rotation under operating pressure. Rotation under pressure allows small positional adjustments to be made to the FDU 100 "on the fly" during fluid delivery to a wellhead. The ability to make small positional adjustments "on the fly" maintains continuous fluid flow during such adjustments, thereby allowing, for example, "on the fly" compensation for fluid surges or vibration. In contrast, comparative swivel joints in the prior art are known to require positional (rotational) locking while under operating pressure, and especially while fluid is being delivered to a wellhead. Thus, if the operator does not position the fluid delivery system precisely prior to beginning fluid delivery to a well, fluid delivery may have to be interrupted later on if small positional adjustments need to be made.

A further technical advantage of the disclosed fluid delivery system is that in some embodiments, wall thickness monitoring is provided to monitor wall thickness of delivery piping and fittings in locations at risk of loss of wall thickness during service.

A further technical advantage of the disclosed fluid delivery system is that some embodiments may provide an integrated nightcap capability. In such embodiments, a nightcap is stored on the stinger assembly. More preferably, the nightcap is positioned longitudinally opposed to the fluid connection adapter on the stinger assembly. In such embodiments, the nightcap assumes a rest position pointing generally upwards while the fluid connection adapter is pointing generally downwards ready for fluid delivery to a wellhead. When the nightcap is desired to be deployed, a user may rotate the stinger assembly so that the nightcap and the fluid connection adapter are inverted. The nightcap is now in position to be inserted into a wellhead.

A further technical advantage of the disclosed fluid delivery system is that its design favors robustness and dependability. Embodiments of the disclosed fluid delivery system minimize moving parts and hydraulics in order to enhance robustness at high pressures in larger diameters.

In accordance with a first aspect, therefore, this disclosure describes embodiments of a fluid delivery system including a fluid delivery unit (FDU), the FDU comprising: a turret and a stinger assembly separated by first and second boom sections in which the boom sections are concatenated via a rotatable connection; a fluid inlet; a fluid connection adapter deployed on the stinger assembly; and a plurality of swivel joints, such that the fluid inlet, the swivel joints and the fluid connection adapter are in fluid flow communication; wherein: (1) each boom section has a turret end and a stinger end; (2) the turret end of the first boom section is rotatably connected to the turret; and (3) the stinger end of the second boom section is rotatably connected to the stinger assembly; wherein rotation of the turret defines rotation about an axis A1 on a directional bearing B1; wherein rotation of the turret end of the first boom section about the turret defines rotation about an axis A2 on a directional bearing B2; wherein rotation of the turret end of the second boom section about the stinger end of the first boom section defines rotation about an axis A3 on a corresponding directional bearing B3;

wherein rotation of the stinger assembly about the stinger end of the second boom section defines rotation about an axis A4 on a corresponding directional bearing B4; wherein the stinger assembly is further configured to rotate about an axis A5 on a corresponding directional bearing B5; wherein the FDU further includes a plurality of rotary encoders R[1 . . . 5], one rotary encoder deployed at each of a corresponding one of axes A[1 . . . 5] such that each rotary encoder is configured to measure a corresponding one of directional bearings B[1 . . . 5] to establish sets of measured bearings values $B_{VAL}[1 . . . 5]$, wherein sets of $B_{VAL}[1 . . . 5]$ define corresponding spatial positions for the FDU; wherein the FDU is configured to store and recall sets of $B_{VAL}[1 . . . 5]$; wherein the FDU is further configured to robotically take up a corresponding spatial position when directed to recall a previously-stored set of $B_{VAL}[1 . . . 5]$.

In embodiments according to the first aspect, rotation about axis A5 is in an orthogonal plane to rotation about axis A4.

In embodiments according to the first aspect, a controller is configured, via wireless communication, to allow a user to perform at least one activity selected from the group consisting of: (a) actuating rotation about selected ones of axes A[1 . . . 5]; (b) deploying a nightcap positioned on the stinger assembly; and (c) storing and recalling sets of $B_{VAL}[1 . . . 5]$.

In embodiments according to the first aspect, a first inclinometer is configured to correct sets of $B_{VAL}[1 . . . 5]$ for the FDU being out of out of level.

In embodiments according to the first aspect, a second inclinometer is configured to maintain the fluid connection adapter in a constant plumb vertical attitude during motion of the FDU.

In embodiments according to the first aspect, at least one swivel joint includes: a first elbow, an annular lip formed on the first elbow, a first housing piece received over the first elbow and retained by the annular lip; a second elbow, an exterior threaded pin surface formed on the second elbow, a second housing piece received over the second elbow; a swivel collet, wherein swivel collet threads on the swivel collet threadably engage with the threaded pin surface such that the second housing piece is retained by the swivel collet; first and second rotary bearings separated by the swivel collet such that the first housing piece is received over the second rotary bearing and the second housing piece is received over the first rotary bearing, wherein rigid connection of the first and second housing pieces allows independent differential rotation between the first and second elbows about the first and second rotary bearings.

In embodiments according to the first aspect, at least one swivel joint includes: a first elbow, an annular lip formed on the first elbow, a first housing piece received over the first elbow and retained by the annular lip; an integral pin, an annular rib formed on a proximal end of the integral pin, a second housing piece received over the integral pin and retained by the annular rib; first and second rotary bearings separated by the annular rib such that the first housing piece is received over the second rotary bearing and the second housing piece is received over the first rotary bearing, wherein rigid connection of the first and second housing pieces allows independent differential rotation between the first elbow and the integral pin about the first and second rotary bearings. In some embodiments, a second elbow is rigidly connected to a distal end of the integral pin.

In some embodiments according to the first aspect, a slew drive is configured to actuate rotation about at least one of axes A[1 . . . 5]. In other embodiments according to the first aspect, a piston is configured actuate at least one of axes A[1 . . . 5].

In accordance with a second aspect, this disclosure describes embodiments of a fluid delivery system including a fluid delivery unit (FDU), the FDU comprising: a turret and a stinger assembly separated by first and second boom sections in which the boom sections are concatenated via a rotatable connection; a fluid inlet; a fluid connection adapter deployed on the stinger assembly; and a plurality of swivel joints, each swivel joint having an internal diameter of not less than about 7 inches, each swivel joint further capable of rotation while retaining an internal pressure of not less than about 10,000 psi; wherein the fluid inlet, the swivel joints and the fluid connection adapter are in fluid flow communication; wherein: (1) each boom section has a turret end and a stinger end; (2) the turret end of the first boom section is rotatably connected to the turret; and (3) the stinger end of the second boom section is rotatably connected to the stinger assembly; wherein rotation of the turret defines rotation about an axis A1 on a directional bearing B1; wherein rotation of the turret end of the first boom section about the turret defines rotation about an axis A2 on a directional bearing B2; wherein rotation of the turret end of the second boom section about the stinger end of the first boom section defines rotation about an axis A3 on a corresponding directional bearing B3; wherein rotation of the stinger assembly about the stinger end of the second boom section defines rotation about an axis A4 on a corresponding directional bearing B4; wherein the stinger assembly is further configured to rotate about an axis A5 on a corresponding directional bearing B5; wherein the FDU further includes a plurality of rotary encoders R[1 . . . 5], one rotary encoder deployed at each of a corresponding one of axes A[1 . . . 5] such that each rotary encoder is configured to measure a corresponding one of directional bearings B[1 . . . 5] to establish sets of measured bearings values $B_{VAL}[1 . . . 5]$, wherein sets of $B_{VAL}[1 . . . 5]$ define corresponding spatial positions for the FDU; wherein the FDU is configured to store and recall sets of $B_{VAL}[1 . . . 5]$; wherein the FDU is further configured to robotically take up a corresponding spatial position when directed to recall a previously-stored set of $B_{VAL}[1 . . . 5]$.

In embodiments according to the second aspect, rotation about axis A5 is in an orthogonal plane to rotation about axis A4.

In embodiments according to the second aspect, a controller is configured, via wireless communication, to allow a user to perform at least one activity selected from the group consisting of: (a) actuating rotation about selected ones of axes A[1 . . . 5]; (b) deploying a nightcap positioned on the stinger assembly; and (c) storing and recalling sets of $B_{VAL}[1 . . . 5]$.

In embodiments according to the second aspect, a first inclinometer is configured to correct sets of $B_{VAL}[1 . . . 5]$ for the FDU being out of out of level.

In embodiments according to the second aspect, a second inclinometer is configured to maintain the fluid connection adapter in a constant plumb vertical attitude during motion of the FDU.

In embodiments according to the second aspect, at least one swivel joint includes: a first elbow, an annular lip formed on the first elbow, a first housing piece received over the first elbow and retained by the annular lip; a second elbow, an exterior threaded pin surface formed on the second elbow, a second housing piece received over the second elbow; a swivel collet, wherein swivel collet threads on the swivel collet threadably engage with the threaded pin surface such that the second housing piece is retained by the swivel collet; first and second rotary bearings separated by the swivel collet such that the first housing piece is received over the second rotary bearing and the second housing piece is received over the first rotary bearing, wherein rigid connection of the first and second housing pieces allows independent differential rotation between the first and second elbows about the first and second rotary bearings.

In embodiments according to the second aspect, at least one swivel joint includes: a first elbow, an annular lip formed on the first elbow, a first housing piece received over the first elbow and retained by the annular lip, an integral pin, an annular rib formed on a proximal end of the integral pin, a second housing piece received over the integral pin and retained by the annular rib; first and second rotary bearings separated by the annular rib such that the first housing piece is received over the second rotary bearing and the second housing piece is received over the first rotary bearing, wherein rigid connection of the first and second housing pieces allows independent differential rotation between the first elbow and the integral pin about the first and second rotary bearings. In such embodiments, a second elbow is rigidly connected to a distal end of the integral pin.

In accordance with a third aspect, this disclosure describes embodiments of a fluid delivery system including a fluid delivery unit (FDU), the FDU comprising: a turret and a stinger assembly separated by a plurality of concatenated boom sections S[1 . . . N] in which adjacent boom sections are connected via rotatable connections; a fluid inlet; a fluid connection adapter deployed on the stinger assembly; a plurality of swivel joints, such that the fluid inlet, the swivel joints and the fluid connection adapter are in fluid flow communication; wherein: (1) each boom section has a turret end and a stinger end; (2) the turret end of boom section S[1] is rotatably connected to the turret; (3) the stinger end of one boom section S[1 . . . N−1] is rotatably connected to the turret end of an adjacent boom section S[2 . . . N]; and (4) the stinger end of boom section S[N] is rotatably connected to the stinger assembly; wherein rotation of the turret defines rotation about an axis A[1] on a directional bearing B[1]; wherein rotation of the turret end of boom section S[1] about the turret defines rotation about an axis A[2] on a directional bearing B[2]; wherein rotation of the turret end of one boom section S[2 . . . N] about the stinger end of an adjacent boom section S[1 . . . N−1] defines rotation about a corresponding axis A[3 . . . N+1] on a corresponding directional bearing B[3 . . . N+1]; wherein rotation of the stinger assembly about the stinger end of boom section S[N] defines rotation about an axis A[N+2] on a corresponding directional bearing B[N+2]; wherein the stinger assembly is further configured to rotate about Q additional rotational axes A[N+3 . . . N+2+Q] each on a corresponding directional bearing B[N+3 . . . N+2+Q]; wherein the FDU further includes a plurality of rotary encoders R[1 . . . N+2+Q], one rotary encoder deployed at each of a corresponding one of axes A[1 . . . N+2+Q] such that each rotary encoder is configured to measure a corresponding one of directional bearings B[1 . . . N+2+Q] to establish sets of measured directional bearings values $B_{VAL}[1 \ldots N+2+Q]$, wherein sets of $B_{VAL}[1 \ldots N+2+Q]$ define corresponding spatial positions for the FDU; wherein the FDU is configured to store and recall sets of $B_{VAL}[1 \ldots N+2+Q]$; wherein the FDU is further configured to robotically take up a corresponding spatial position when directed to recall a previously-stored set of $B_{VAL}[1 \ldots N+2+Q]$.

In embodiments according to the third aspect, rotation about one of axes A[N+3 . . . N+2+Q] is in an orthogonal plane to rotation about axis A[N+2].

In embodiments according to the third aspect, a controller is configured, via wireless communication, to allow a user to perform at least one activity selected from the group consisting of: (a) actuating rotation about selected ones of axes A[1 . . . N+2+Q]; (b) deploying a nightcap positioned on the stinger assembly; and (c) storing and recalling sets of $B_{VAL}[1 \ldots N+2+Q]$.

In embodiments according to the third aspect, a first inclinometer corrects sets of $B_{VAL}[1 \ldots N+2+Q]$ for the FDU being out of out of level.

In embodiments according to the third aspect, a second inclinometer maintains the fluid connection adapter in a constant plumb vertical attitude during motion of the FDU.

In embodiments according to the third aspect, at least one swivel joint includes: a first elbow, an annular lip formed on the first elbow, a first housing piece received over the first elbow and retained by the annular lip; a second elbow, an exterior threaded pin surface formed on the second elbow, a second housing piece received over the second elbow; a swivel collet, wherein swivel collet threads on the swivel collet threadably engage with the threaded pin surface such that the second housing piece is retained by the swivel collet; first and second rotary bearings separated by the swivel collet such that the first housing piece is received over the second rotary bearing and the second housing piece is received over the first rotary bearing, wherein rigid connection of the first and second housing pieces allows independent differential rotation between the first and second elbows about the first and second rotary bearings.

In embodiments according to the third aspect, at least one swivel joint includes: a first elbow, an annular lip formed on the first elbow, a first housing piece received over the first elbow and retained by the annular lip, an integral pin, an annular rib formed on a proximal end of the integral pin, a second housing piece received over the integral pin and retained by the annular rib; first and second rotary bearings separated by the annular rib such that the first housing piece is received over the second rotary bearing and the second housing piece is received over the first rotary bearing, wherein rigid connection of the first and second housing pieces allows independent differential rotation between the first elbow and the integral pin about the first and second rotary bearings. In such embodiments, a second elbow is rigidly connected to a distal end of the integral pin.

In some embodiments according to the third aspect, a slew drive is configured to actuate rotation about at least one of axes A[1 . . . N+2+Q]. In other embodiments according to the third aspect, a piston is configured actuate at least one of axes A[1 . . . N+2+Q].

In accordance with a fourth aspect, this disclosure describes embodiments of a fluid delivery system including a fluid delivery unit (FDU), the FDU comprising: a turret and a stinger assembly separated by a plurality of concatenated boom sections S[1 . . . N] in which adjacent boom sections are connected via rotatable connections; a fluid inlet; a fluid connection adapter deployed on the stinger assembly; a plurality of swivel joints, such that the fluid inlet, the swivel joints and the fluid connection adapter are in fluid flow communication; wherein: (1) each boom section has a turret end and a stinger end; (2) the turret end of boom section S[1] is rotatably connected to the turret; (3) the stinger end of one boom section S[1 . . . N−1] is rotatably connected to the turret end of an adjacent boom section S[2 . . . N]; and (4) the stinger end of boom section S[N] is rotatably connected to the stinger assembly; wherein rotation of the turret defines rotation about an axis A[1] on a directional bearing B[1]; wherein rotation of the turret end of boom section S[1] about the turret defines rotation about an axis A[2] on a directional bearing B[2]; wherein rotation of the turret end of one boom section S[2 . . . N] about the stinger end of an adjacent boom section S[1 . . . N−1] defines rotation about a corresponding axis A[3 . . . N+1] on a corresponding directional bearing B[3 . . . N+1]; wherein rotation of the stinger assembly about the stinger end of boom section S[N] defines rotation about an axis A[N+2] on a corresponding directional bearing B[N+2]; wherein the FDU further includes a plurality of rotary encoders R[1 . . . N+2], one rotary encoder deployed at each of a corresponding one of axes A[1 . . . N+2] such that each rotary encoder is configured to measure a corresponding one of directional bearings B[1 . . . N+2] to establish sets of measured directional bearings values $B_{VAL}[1 \ldots N+2]$, wherein sets of $B_{VAL}[1 \ldots N+2]$ define corresponding spatial positions for the FDU; wherein the FDU is configured to store and recall sets of $B_{VAL}[1 \ldots N+2]$; wherein the FDU is further configured to robotically take up a corresponding spatial position when directed to recall a previously-stored set of $B_{VAL}[1 \ldots N+2]$.

In embodiments according to the fourth aspect, a controller is configured, via wireless communication, to allow a user to perform at least one activity selected from the group consisting of: (a) actuating rotation about selected ones of axes A[1 . . . N+2]; (b) deploying a nightcap positioned on the stinger assembly; and (c) storing and recalling sets of $B_{VAL}[1 \ldots N+2]$.

The foregoing has outlined rather broadly some of the features and technical advantages of the technology embodied in the disclosed fluid delivery system technology, in order that the detailed description that follows may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described and as set forth in the appended claims.

BRIEF DESCRIPTION OF THE DRAWINGS

For a more complete understanding of embodiments described in detail below, and the advantages thereof, reference is now made to the following drawings, in which:

FIG. 9 illustrates, in isolation, a currently preferred layout of connected fluid-bearing piping and fittings on board an embodiment of FDU 100 according to this disclosure;

FIG. 10 is an enlarged view as shown on FIG. 9;

FIGS. 1A, 11B and 11C illustrate assembled, section and exploded views respectively of swivel joint embodiment 500A;

FIG. 13A illustrates currently preferred embodiments of stinger assembly 600 in detail, and of nightcap 1000 generally;

FIG. 13B is a section as shown on FIG. 13A;

DETAILED DESCRIPTION

The following description of embodiments provides non-limiting representative examples using Figures and schematics with part numbers and other notation to describe features and teachings of different aspects of the disclosed technology in more detail. The embodiments described should be recognized as capable of implementation separately, or in combination, with other embodiments from the description of the embodiments. A person of ordinary skill in the art reviewing the description of embodiments will be capable of learning and understanding the different described aspects of the technology. The description of embodiments should facilitate understanding of the technology to such an extent that other implementations and embodiments, although not specifically covered but within the understanding of a person of skill in the art having read the description of embodiments, would be understood to be consistent with an application of the disclosed technology.

Figure 1:
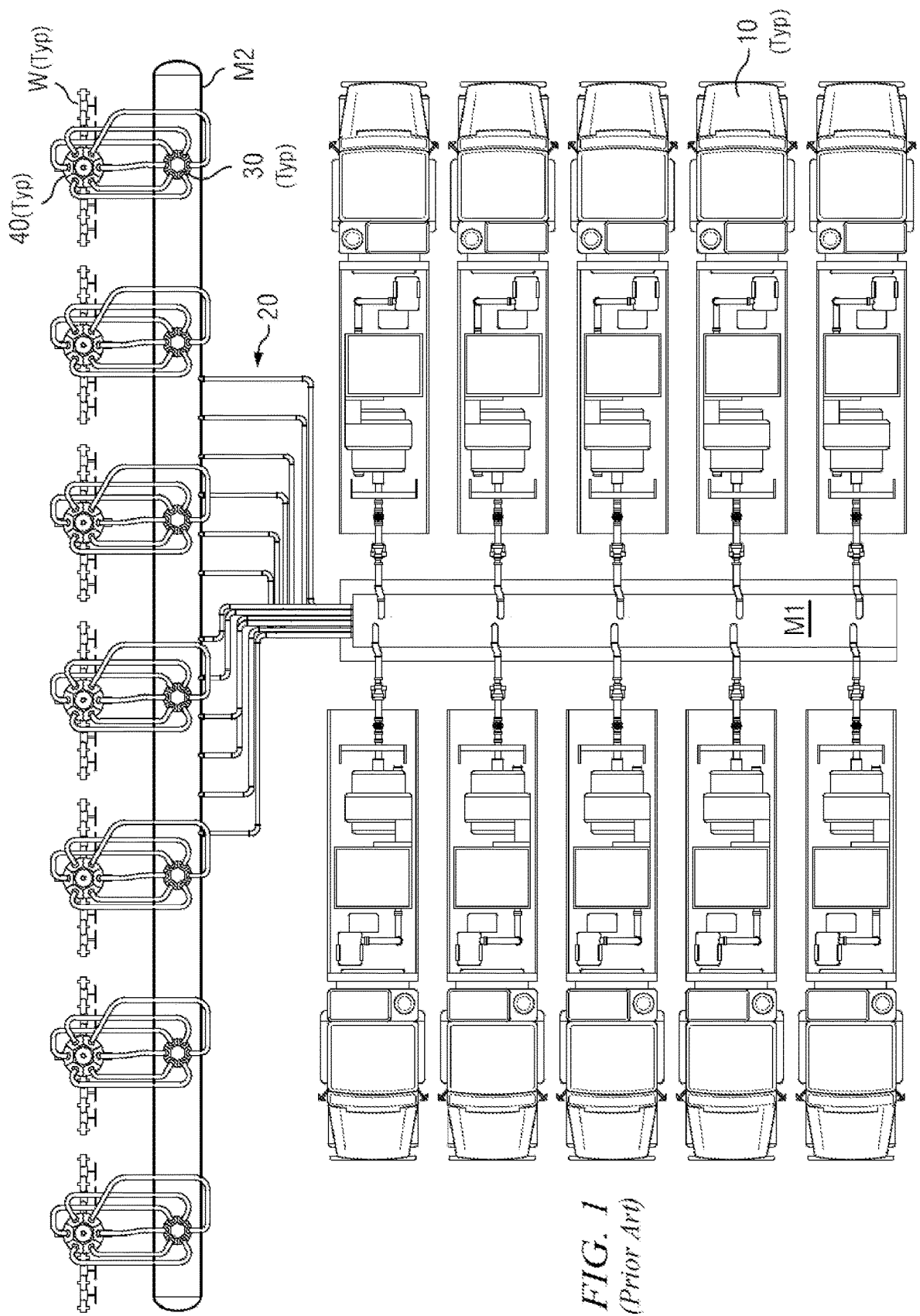
FIG. 1 illustrates one prior art arrangement for delivery of fluid to selected wellheads.
Figure 2:
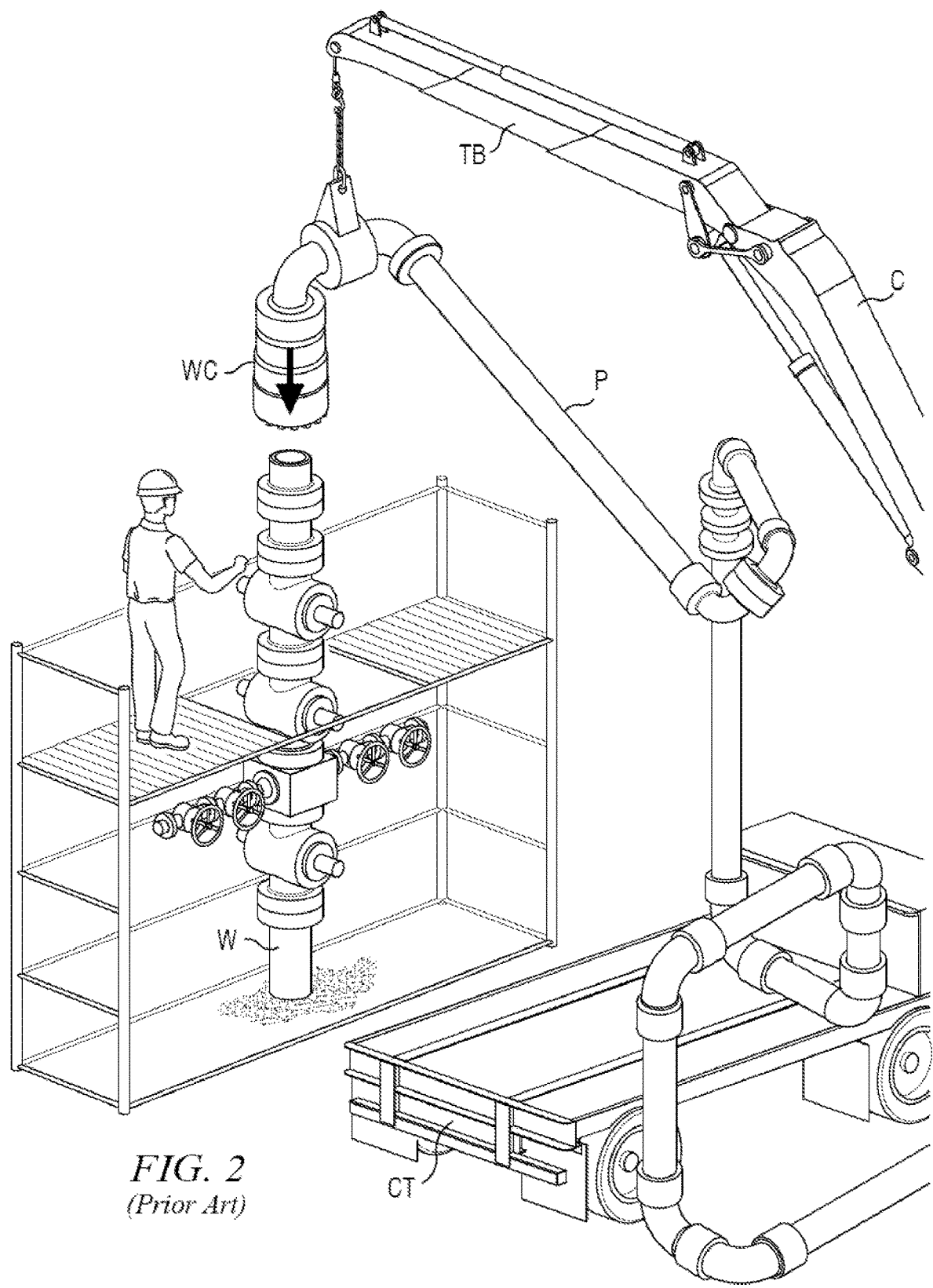
FIG. 2 illustrates another prior art arrangement for delivery of fluid to a selected wellhead.

FIGS. 1 and 2 of this disclosure illustrate examples of the prior art on which the disclosed technology seeks to improve. FIGS. 1 and 2 are discussed in detail above in the "Background" section.

FIGS. 3 through 15 of this disclosure illustrate currently preferred embodiments of the disclosed fluid delivery system technology. For the purposes of the following disclosure, FIGS. 3 through 15 should be viewed together. Any part, item, or feature that is identified by part number on one of FIGS. 3 through 15 will have the same part number when illustrated on another of FIGS. 3 through 15. It will be understood that the embodiments as illustrated and described with respect to FIGS. 3 through 15 are exemplary only and serve to illustrate the larger concept of the technology. The inventive material set forth in this disclosure is not limited to such illustrated and described embodiments.

Fluid Delivery Unit (FDU) 100

Figure 3:
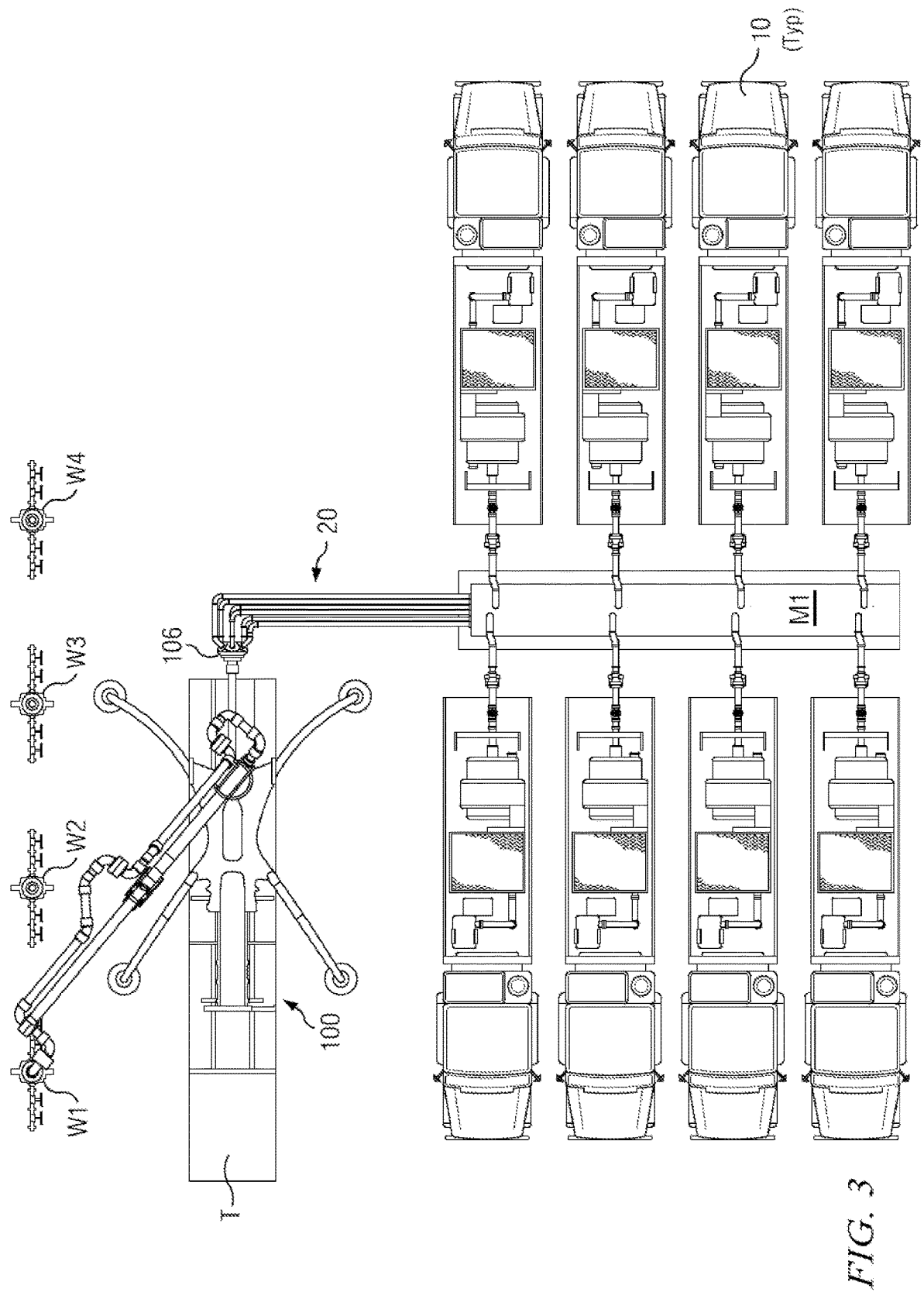
FIG. 3 illustrates an embodiment of Fluid Delivery Unit (FDU) 100 delivering fluid to selected wellheads in accordance with this disclosure.
Figure 4:
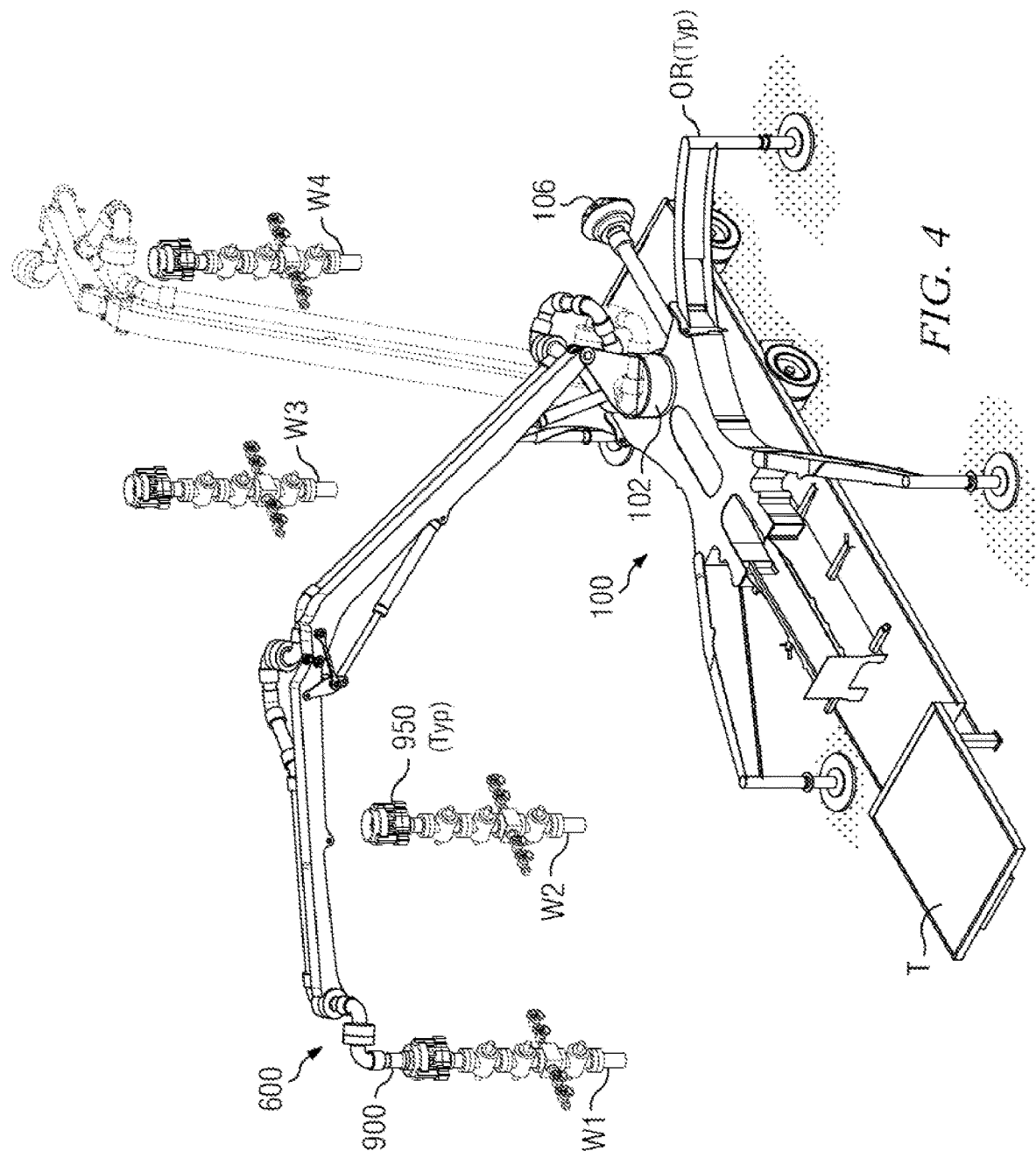
FIG. 4 further illustrates an embodiment of Fluid Delivery Unit (FDU) 100 delivering fluid to selected wellheads in accordance with this disclosure.
Figure 5:
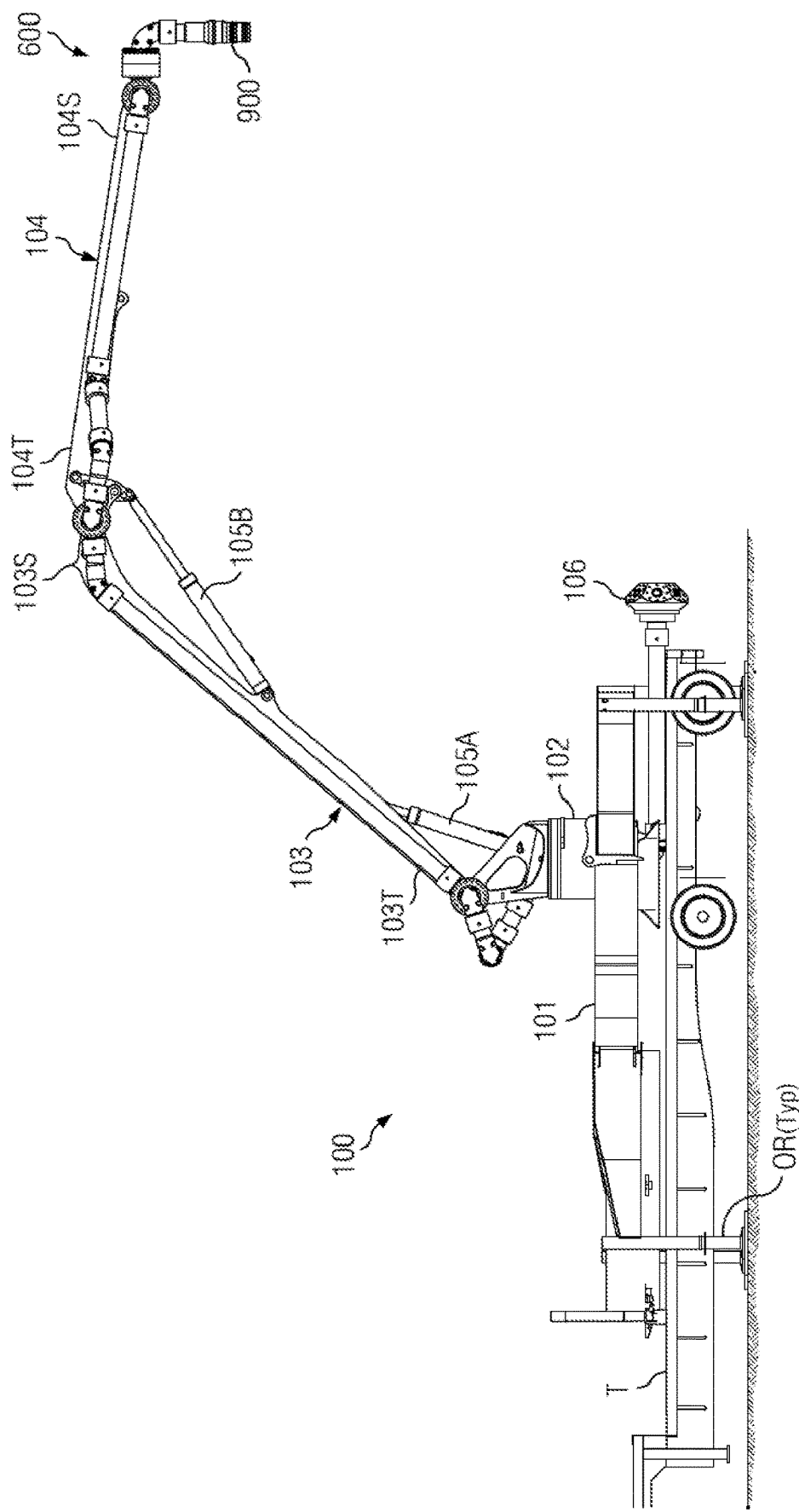
FIG. 5 is an elevation view of an embodiment of FDU 100 according to this disclosure.
Figure 6:
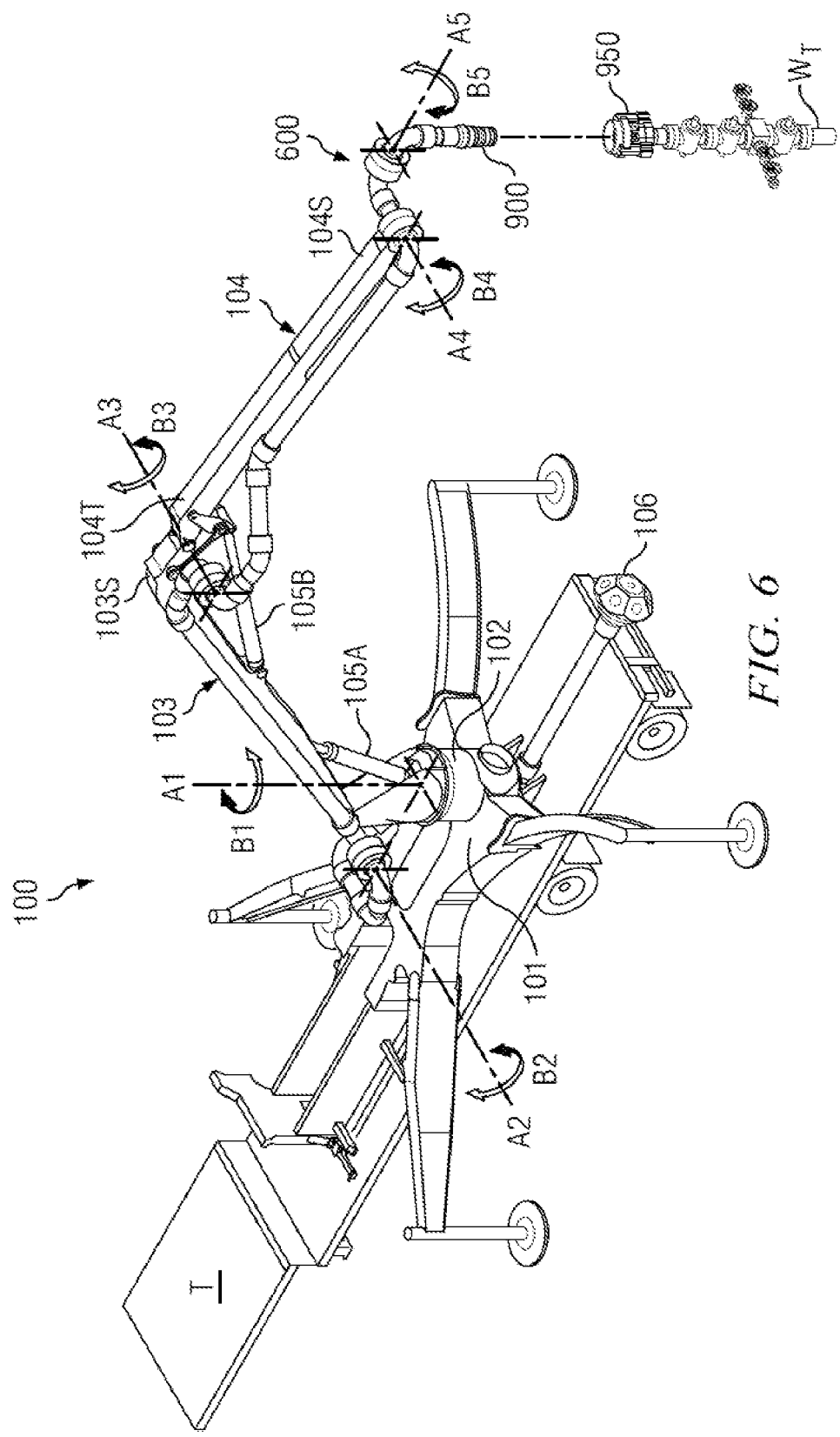
FIG. 6 is a perspective view of spatial positioning of FDU 100 embodiments according this disclosure, illustrating rotation axes A1 through A5 on which corresponding directional bearings B1 through B5 may be selected.
Figure 7:
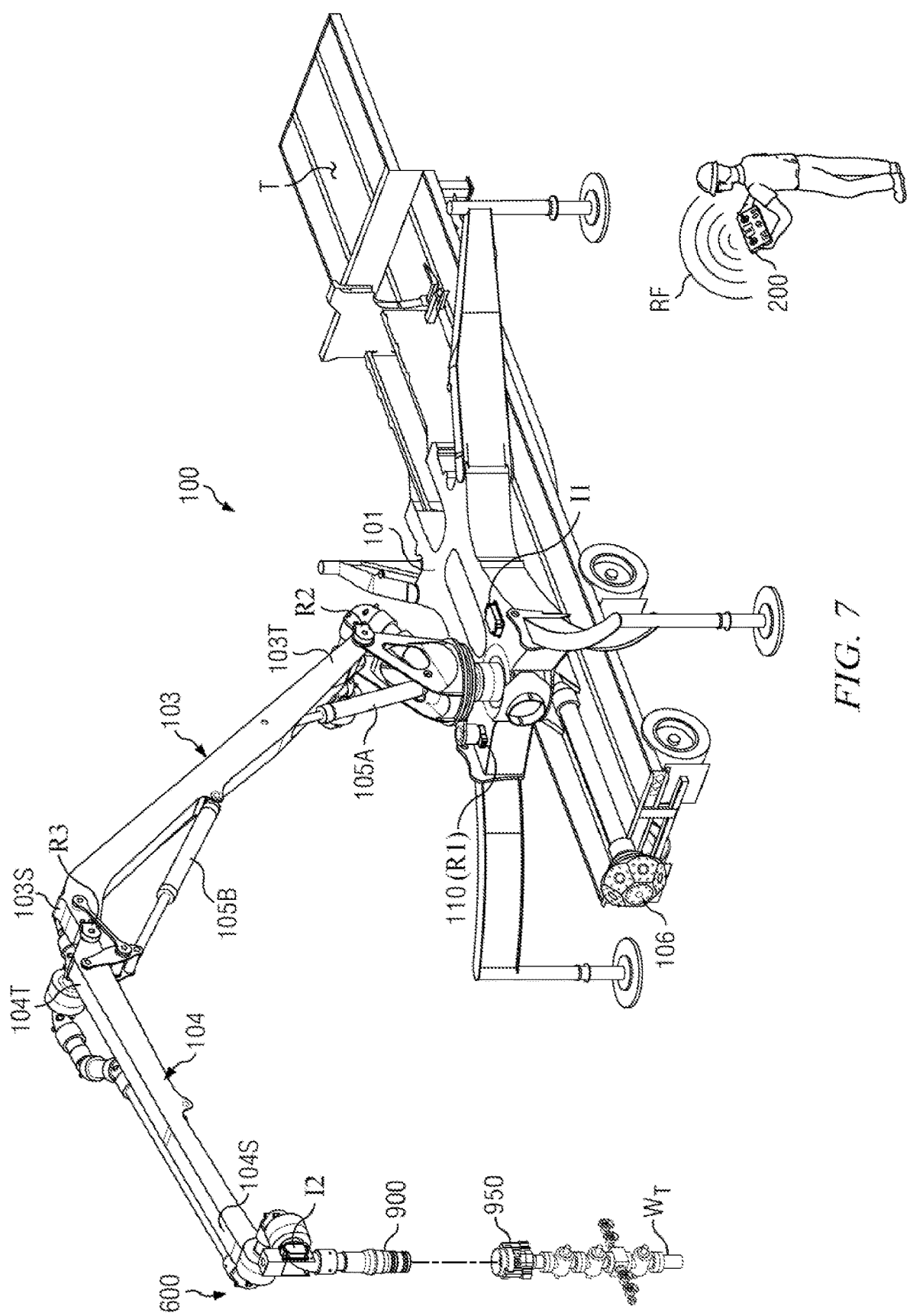
FIG. 7 is a further perspective view of an embodiment of FDU 100 according to this disclosure, in which spatial positioning and other aspects of FDU 100 are under control of controller 200.

FIGS. 3 and 4 illustrate an embodiment of Fluid Delivery Unit (FDU) 100 delivering fluid to selected wellheads W1 through W4 in accordance with this disclosure. FIG. 3 is a general plan drawing, and FIG. 4 is a general perspective drawing, each illustrating a currently preferred embodiment of FDU 100 in an exemplary jobsite deployment. FIG. 5 is an elevation view of an embodiment of FDU 100 by itself. FIGS. 6 and 7 are perspective views illustrating currently preferred embodiments of spatial positioning of the FDU 100 embodiment of FIG. 5. Spatial positioning is described in detail in a separate section of this disclosure further below. FIG. 9 illustrates, in isolation, a currently preferred layout of connected fluid-bearing piping and fittings on board the FDU 100 embodiment of FIG. 5. Generally, FIG. 9 depicts such fluid-bearing piping and fittings including a fluid inlet 106, a plurality of swivel joints 500A, 500B and a fluid connection adapter 900 all in fluid flow communication. FIG. 10 is an enlarged view as shown on FIG. 9.

FIGS. 3 and 4 illustrate FDU 100 deployed on site via truck trailer T. Deployment on truck trailer T is currently preferred for convenience in bringing FDU 100 to a desired location. However, the scope of this disclosure is not limited to the manner by which FDU 100 is deployed on site. FIGS. 3 and 4 (and especially FIG. 4) further illustrate FDU 100 deployed to deliver fluid (such as fracking fluid) to selected wellheads W1 through W4 within reach of FDU 100. Again, the scope of this disclosure is not limited to fracking fluid delivery service. FDU 100 may also be deployed in other applications for which it is suited.

It will be appreciated from FIGS. 3 and 4 that FDU 100 is disposed to deliver fluid anywhere within its range. Depiction on FIGS. 3 and 4 of delivery to a selected one of wellheads W1 through W4 is for illustrative convenience only. Currently preferred embodiments of FDU 100 include rotating base turret 102 which, as may be seen on FIG. 4, enables FDU 100 to deliver fluid anywhere within range on a 360-degree rotation of turret 102. For more examples of possible fluid delivery ranges for some embodiments, see FIG. 4B and associated disclosure of commonly-assigned U.S. Provisional Patent Application Ser. No. 62/811,595, filed Feb. 28, 2019 (the disclosure of which provisional application is incorporated herein by reference). It will nonetheless be understood that fluid delivery ranges illustrated on FIGS. 3 and 4 hereof, and on FIG. 4B of Ser. No. 62/811,595 are exemplary only and that the scope of this disclosure is not limited to such illustrated fluid delivery ranges. Further, both smaller scale and larger scale embodiments of FDU 100 are within the scope hereof.

FIG. 3 shows FDU 100 receiving fluid ultimately from pumping units 10. As with the prior art depiction of FIG. 1, pumping units 10 may be conventional fracking pump and delivery trucks (as illustrated), although the scope of this disclosure is indifferent to the manner by which fluid is ultimately made available to FDU 100. On FIG. 3, pumping units 10 deliver fluid at pressure into manifold M1. Again as with the prior art depiction of FIG. 1, manifold M1 may be known colloquially as a "missile" in some embodiments. Fluid transfer lines 20 on FIG. 3 deliver fluid from manifold M1 to FDU fluid inlet 106. Seen more clearly on FIGS. 5, 6 and 7, the illustrated embodiment of FDU fluid inlet 106 may be of the manifold style commonly referred to as a "goat head" in oilfield fracking and well completion operations, with a hollow body providing multiple connection points (e.g. flange faces) to connect to individual fluid transfer lines 20. In the embodiment illustrated on FIG. 3 through FIG. 7, up to seven (7) fluid transfer lines 20 may be connected to FDU fluid inlet 106 for delivery of fluid by FDU 100 to selected wells within reach of FDU 100. It will nonetheless be appreciated that FDU fluid inlet 106 as illustrated on FIG. 3 through FIG. 7 is exemplary only, and other non-illustrated embodiments may provide more or fewer supply lines. The scope of this disclosure is not limited to any particular design of FDU fluid inlet 106. Moreover, although not illustrated, additional fluid pressure (e.g. via additional pumping) may be provided in some embodiments between manifold M1 and FDU inlet manifold 106. Such additional fluid pressure, if required, helps ensure FDU 100 is receiving fluid for delivering to wellheads at desired service pressures and flow rates/volumes.

FIG. 4 illustrates FDU 100 providing stinger assembly 600 at a distal delivery end thereof. Stinger assembly 600 is described in greater detail below in a separate section of this disclosure. However, FIG. 4 depicts stinger assembly 600 including fluid connection adapter 900. FIG. 4 also shows each wellhead W1 through W4 disposed to receive fluid via a fluid connection housing assembly 950 connected to the top thereof. Fluid connection housing assemblies 950 are advantageously alike in that fluid connection adapter 900 on stinger assembly 600 is configured to be received and locked into any one of a desired fluid connection housing assembly 950 prior to delivery of fluid to a corresponding wellhead W1 through W4.

Currently preferred embodiments of fluid connection adapter 900 and fluid connection housing assembly 950 are consistent with embodiments described in the following commonly-assigned disclosures, all of which are incorporated herein by reference: U.S. Provisional Patent Application Ser. No. 62/649,008 filed Mar. 28, 2018; U.S. Nonprovisional patent application Ser. No. 16/037,687 filed Jul. 17, 2018; and U.S. Nonprovisional patent application Ser. No. 16/221,279 filed Dec. 14, 2018 (collectively the "Preferred Fluid Connection Designs"). It will be nonetheless understood that although currently preferred embodiments deploy fluid connection adapter 900 and fluid connection housing assembly 950 consistent with the Preferred Fluid Connection Designs, the scope of this disclosure is not limited to any particular design of connection between stinger assembly 600 and wellheads W1 through W4.

FIG. 5 is an elevation view of an embodiment of FDU 100 according to this disclosure. As described above with respect to FIGS. 3 and 4, FIG. 5 shows FDU 100 preferably deployed on site via truck trailer T, although the scope if this disclosure is not limited in this regard. The embodiment of FDU 100 on FIG. 5 provides FDU superstructure 101 rigidly attached to truck trailer T. As shown on FIGS. 4 and 5, FDU superstructure 101 provides conventional outriggers OR for stabilizing and leveling FDU 100. In other embodiments, outriggers OR may be connected to truck trailer T. The scope of this disclosure is not limited to the manner in which FDU 100 may be stabilized and leveled. Conventional hydraulic controls may actuate and manipulate outriggers OR to set FDU 100 in stable and level fashion on the local terrain.

FDU 100 on FIG. 5 further includes rotating base turret 102. Turret 102 is disposed to rotate about FDU superstructure 101. As previously described with reference to FIG. 4, preferred embodiments of turret 102 enable FDU 100 to deliver fluid anywhere within range on a 360-degree rotation of turret 102. FIG. 5 further depicts first boom section 103 and second boom section 104. First and second boom sections 103, 104 are concatenated via a rotatable connection to be further described below. First boom section 103 has a turret end 103T and a stinger end 103S (referring to stinger assembly 600, also shown on FIG. 5). Second boom section 104 also has a turret end 104T and a stinger end 104S. Turret end 103T of first boom section 103 is rotatably connected to turret 102 as described further below with reference to FIG. 6. As shown on FIG. 5, rotation of first boom section 103 about turret 102 is actuated by extension and retraction of first boom piston 105A. Stinger end 103S of first boom section 103 connects to turret end 104T of second boom section 104 also via a rotating connection described further below with reference to FIG. 6. As shown on FIG. 5, rotation of second boom section 104 about first boom section 103 is actuated by extension and retraction of second boom piston 105B. Stinger end 104S of second boom section 104 is rotatably connected to stinger assembly 600 also as described further below with reference to FIG. 6 and FIGS. 13A, 13B and 13C. Actuation of rotation of stinger assembly 600 about second boom section 104 is described in detail further below in a separate section of this disclosure.

It will therefore be appreciated from FIG. 5 that first and second boom sections 103, 104 on FDU 100 are articulated boom sections connected via rotating connections whose independent rotation allows FDU 100 to deploy stinger assembly 600 (and fluid connection adapter 900) to reach and connect to selected wellheads within range. Preferred embodiments, as illustrated, provide two (2) concatenated boom sections 103, 104. The scope of this disclosure is not limited, however, to two (2) concatenated boom sections 103, 104, and other embodiments (not illustrated) may deploy more or fewer concatenated articulated boom sections.

In preferred embodiments illustrated and described with reference to FIGS. 7 and 8, operators may use remote-controlled spatial positioning to rotate turret 102 and extend/retract boom sections 103, 104 in order to deploy stinger assembly 600 (and fluid connection adapter 900) to reach and connect to selected wellheads within range. Such spatial positioning is described in detail further below in a separate section of this disclosure. In other embodiments (not illustrated), conventional hydraulic controls may enable user-operated rotation of turret 102 and user-operated extension/retraction of boom section 103, 104 as required to deploy stinger assembly 600 (and fluid connection adapter 900) to reach and connect to selected wellheads within range. The scope of this disclosure is not limited to a particular mode of user control.

FIG. 9 illustrates, in isolation, a currently preferred layout of connected fluid-bearing piping and fittings on board the FDU 100 embodiment of FIG. 5. FIG. 10 is an enlarged view as shown on FIG. 9. FIGS. 9 and 10 depict FDU fluid inlet 106 connected by fluid-bearing piping and fittings all the way to fluid connection adapter 900 on stinger assembly 600. Fluid-bearing piping and fittings include swivel joint embodiments 500A, 500B as further described below with reference to FIGS. 11A through 11C and FIGS. 12A through 12C. Currently preferred embodiments of swivel joints 500A, 500B are described in detail below in a separate section of this disclosure. Fluid-bearing piping and fittings on FIGS. 9 and 10 further include union assemblies 300 and clamp assemblies 400. Currently preferred embodiments of union assemblies 300 are further described below with reference to FIGS. 11A through 11C. Currently preferred embodiments of clamp assemblies 400 are further described below with reference to FIGS. 12A through 12C. Fluid-bearing piping and fittings on FIGS. 9 and 10 further include delivery piping 120 and conventional fittings 130 such as standard elbows.

It will be appreciated that the scope of this disclosure is not limited to the currently preferred layout of fluid-bearing piping and fittings illustrated on FIGS. 9 and 10. The layout illustrated on FIGS. 9 and 10 is configured for the embodiment of FDU 100 on FIG. 5, which itself is an exemplary embodiment of FDU 100. The layout of fluid-bearing piping and fittings on a particular FDU 100 embodiment will depend on the design of the FDU 100 embodiment.

It will be further appreciated that the scope of this disclosure includes embodiments in which FDU does not just deliver fluid from a source to a wellhead W. The scope of this disclosure also includes non-illustrated embodiments in which FDU delivers fluid from a wellhead W to a desired destination.

In other, non-illustrated embodiments, fluid-bearing piping could be routed inside boom sections rather than on the side of the boom section.

Swivel Joint Embodiments 500A and 500B

As has been previously noted, currently preferred embodiments of FDU 100 according to this disclosure are designed for delivery of fracking fluid to wellheads. In some FDU 100 embodiments designed for fracking service, fluid-bearing piping and fittings are designed for 7,500 psi ("7.5 ksi") internal fluid pressures (plus an appropriate factor of safety), and more preferably for 10 ksi internal fluid pressures (plus an appropriate factor of safety), and yet more preferably for 15 ksi internal fluid pressures (plus an appropriate factor of safety). Such FDU 100 embodiments designed for fracking service further deliver fluid volumes suitable for fracking operations downhole. Such fluid delivery volumes typically necessitate a 7"-8" internal diameter ("ID").

Designing a 7"-8" ID swivel joint rated for 15 ksi working pressure has proved challenging. Commercially-available swivel joints rated for 15 ksi service are typically available in sizes up to 4" ID only. Swivel joints with 4" ID will not deliver the volume of fluid required for fracking operations. Larger ID commercially-available swivel joints have proven unable to withstand the tensile stresses imparted by 15 ksi working pressure. It will be understood that increasing the diameter of the swivel joint while maintaining the operating pressure increases geometrically the tension static load force exerted by the pressure at the ID circumference. Such static load forces act to "break apart" the swivel joint at its outer circumference.

As a result, several custom designs have been proposed, designed and tested with Finite Element Analysis (FEA) to arrive at a suitable design for swivel joint embodiments 500A, 500B as described herein for fracking fluid delivery service. The disclosure of U.S. Provisional Patent Application Ser. No. 62/811,595, filed Feb. 28, 2019, incorporated herein by reference, describes a previous design PD1 that had to be rejected for use with fracking fluid delivery service because the FEA indicated that PD1 would likely fail under load if asked to deliver the volume of fracking fluid required at 15 ksi operating pressure.

FIGS. 1A through 12C of this disclosure illustrate two swivel joint embodiments 500A and 500B engineered to be suitable for the currently preferred fracking fluid delivery embodiments of FDU 100 described in this disclosure. Differences generally between swivel joint embodiments 500A and 500B include that swivel joint embodiment 500A is a pin and collet design, whereas swivel joint embodiment 500B is an integral pin design.

Swivel joint embodiments 500A and 500B, as described and illustrated herein, are the result of a subsequent, refined design of swivel joint that FEA indicated would perform under load if asked to deliver the volume of fracking fluid required at 15 ksi operating pressure. Embodiments of swivel joints 500A, 500B were originally selected at 8" ID in order to be sure to enable FDU 100 to deliver fluid at required volumes. FEA demonstrated that although a performing design in accordance with swivel joints 500A and 500B above was available, this 8" ID design created an undesirably heavy fluid-bearing piping and fittings layout for FDU 100.

Design then moved to a 7" ID for swivel joint embodiments 500A, 500B, with an associated design change to 7" ID fluid-bearing piping and fittings layout on FDU 100. It was determined that a 7" ID assembly would also deliver an acceptable volume of fracking fluid at an operating pressure of 15 ksi. Migrating to a 7" design brought several technical advantages over the 8" design: (a) lower overall weight of fluid-bearing piping and fittings layout; (b) wider commercial availability of standard parts such as delivery pipe, flanges and elbows; and (c) higher margin of safety at 15 ksi operating pressure. With regard to the higher margin of safety, FEA showed that the 7" embodiment would hold up to 1.9 million lbs force static load at the circumference, well exceeding the goal of 1.3 million lbs force static load for 15 ksi rated operating pressure.

Referring now to U.S. Provisional Patent Application Ser. No. 62/811,595 ("'595"), filed Feb. 28, 2019, incorporated herein by reference, FIGS. 8A and 8B of '595 depict FEA results for 7" ID embodiments of swivel joints 500A and 500B respectively from FIGS. 11A through 12C in this disclosure. FIG. 8C of '595 depicts a further FEA chart for a 7" ID embodiment of swivel joint 500B from FIGS. 12A through 12C of this disclosure. As can be seen on FIGS. 8A through 8C of '595, FEA determined that 7" ID embodiments of swivel joints 500A and 500B would perform under load if asked to deliver the volume of fracking fluid required at 15 ksi operating pressure.

Swivel joint embodiments 500A, 500B on FIGS. 11A through 12C also allow rotation under operating pressure. This feature is yet a further technical advantage over known prior art swivels in fracking service. Swivel joint embodiments 500A, 500B allow such rotation under pressure even while fluid is being delivered to a wellhead. Rotation under pressure in turn allows small positional adjustments to be made to FDU 100 "on the fly" during fracking fluid delivery to a wellhead. The ability to make small positional adjustments "on the fly" maintains continuous fluid flow during such adjustments, and further reduces stresses on FDU 100 and its components.

In contrast, comparative swivel joints in the prior art are known to require positional (rotational) locking while under operating pressure, and especially while fluid is being delivered to a wellhead. If, as in the prior art, the swivel joints are locked during fluid delivery, the delivery system is prevented from making small positional adjustments to suit environmental conditions during delivery, such as, for example, to compensate for small displacements due to fluid surges or vibration. Thus, in the prior art, if the operator does not position the fluid delivery system precisely prior to beginning fluid delivery to a well, fluid delivery may have to be interrupted later on if small positional adjustments need to be made. Fluid delivery will have to be stopped to unlock the swivels so that positional adjustment can be made. Further, even if positional adjustments are not needed, the boom components may be unnecessarily stressed with locked swivels if initial positioning is imprecise.

Figure 11C:
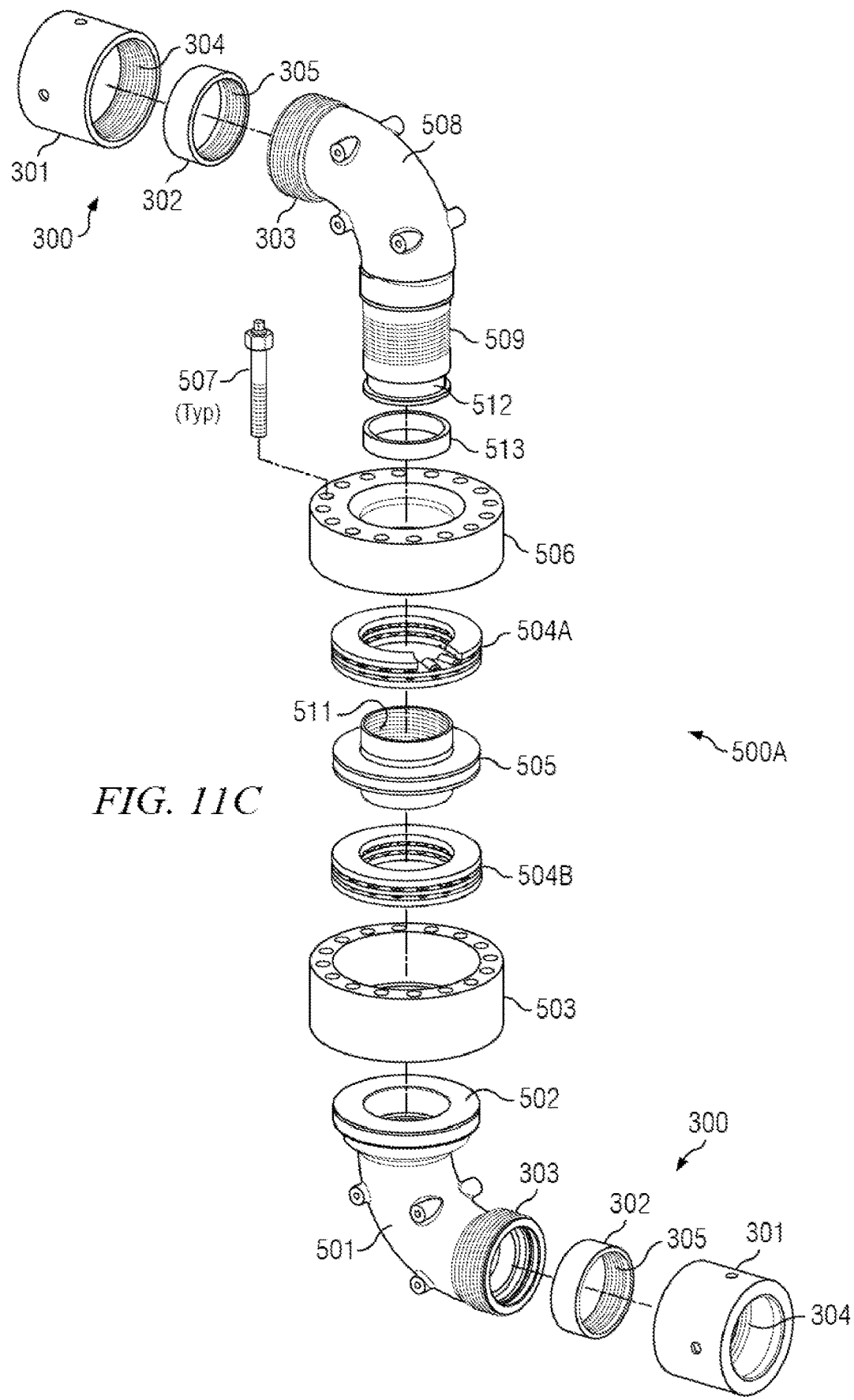

FIG. 1A depicts an exterior view of swivel joint embodiment 500A as fully assembled. FIG. 11B is a section as shown on FIG. 11A. FIG. 11C is an exploded view of FIG. 11A. Looking at FIGS. 11A, 11B and 11C together, swivel joint embodiment 500A includes first elbow 501 with an annular lip 502 formed on a proximal end thereof. When swivel joint 500A is assembled (refer FIGS. 11A and 11B), first housing piece 503 is received over first elbow 501 and is retained by annular lip 502.

With further reference to FIGS. 11A, 11B and 11C together, first and second housing pieces 503, 506 receive rotary bearings 504A and 504B separated by swivel collet 505. Rotary bearings 504A, 504B will be described in more detail below. Second elbow 508 has exterior threaded pin surface 509 and exterior seal groove 512 formed on a proximal end thereof. Second housing piece 506 is received over second elbow 508. Swivel collet 505 has internal swivel collet threads 511 such that, when swivel collet threads are threadably engaged with exterior threaded pin surface 509 on second elbow 508, second housing piece 506 and rotary bearing 504A are retained by swivel collet 505, and second housing piece 506 is received over rotary bearing 504A. Rotary bearing 504B is received on the other side of swivel collet 505 from rotary bearing 504A, and first housing piece 503 is received over rotary bearing 504B. First and second housing pieces 503, 506 are rigidly connected together with fasteners 507. As fasteners 507 connect first and second housing pieces 503 and 506, exterior seal groove 512 on second elbow 508 is received into annular lip 502 on first elbow 501. Seal ring 513, as received into exterior seal groove 512, forms a rotating seal between first and second elbows 501, 508 while still allowing independent differential rotation between first and second elbows 501, 508 within swivel joint embodiment 500A.

Looking further now at FIGS. 11A, 11B and 11C together, union assemblies 300 are depicted at the distal ends of each of first and second elbows 501, 508. Union assemblies 300 are preferably alike throughout this disclosure, and are formed by union collet 302 received into union nut 301. Union nut 301 is then threadably received onto a first fitting (e.g. first or second elbows 501, 508 per FIGS. 11A, 11B and 11C) via threaded engagement between union nut threads 304 and fitting threads 303 on the first fitting. At the same time, union collet 302 is threadably received onto a second fitting (e.g. one end of fluid connection adapter 900 or one end of a piece of delivery piping 120 per FIGS. 13A, 13B and 13C)) via threaded engagement between union collet threads 305 and mating threads provided on the end of the second fitting. Preferably the threaded engagement between union collet 302 and the second fitting is via a left hand thread, while the threaded engagement between union nut 301 and the first fitting is via a conventional right hand thread. In this way, when union nut 301 is tightened down on the first fitting, tightening rotation of the threaded engagement between union nut 301 and the first fitting will also cause tightening of the threaded engagement between union collet 302 and the second fitting.

Figures 12A, 12B:
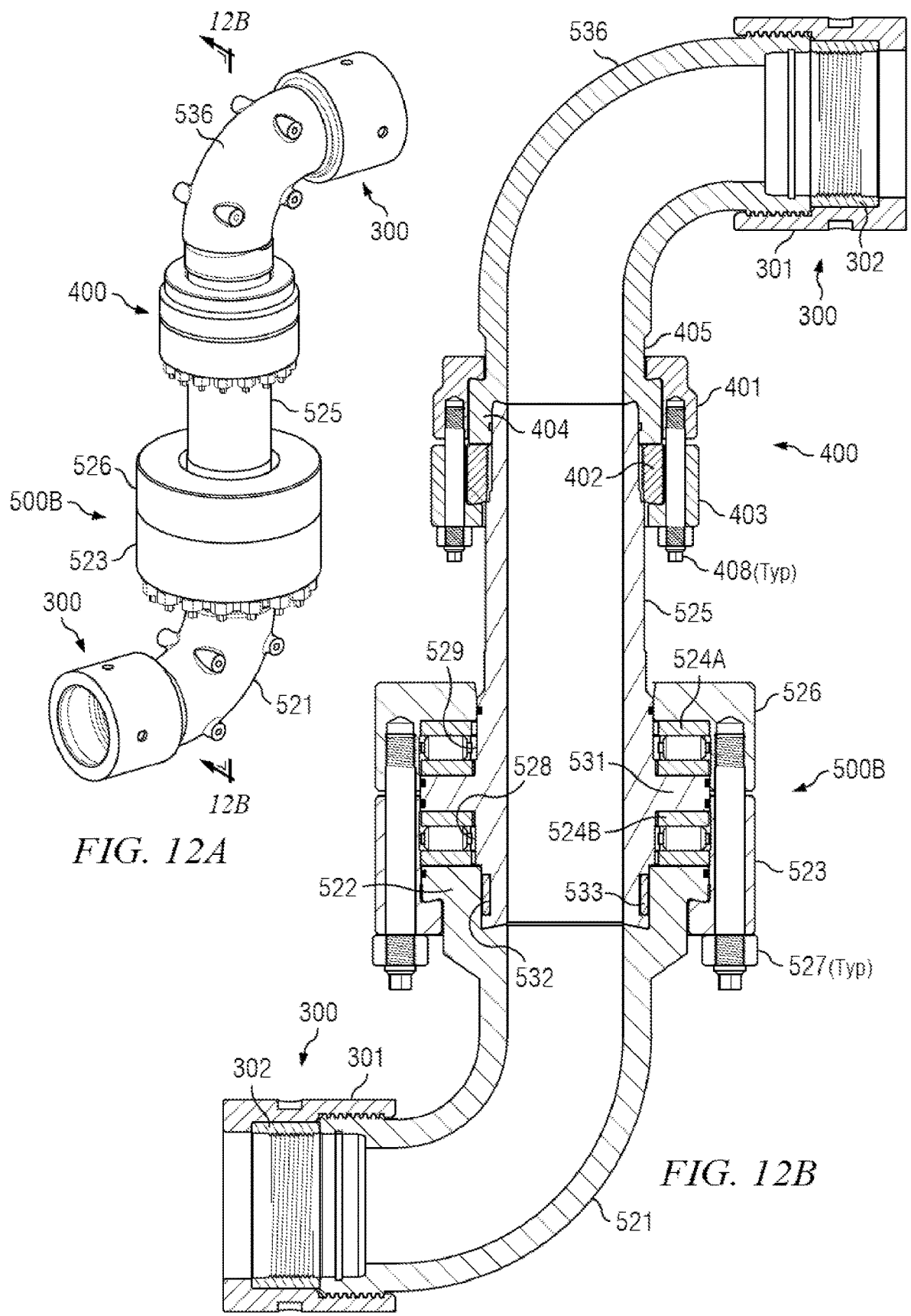
FIGS. 12A, 12B and 12C illustrate assembled, section and exploded views respectively of swivel joint embodiment 500B.
Figure 12C:
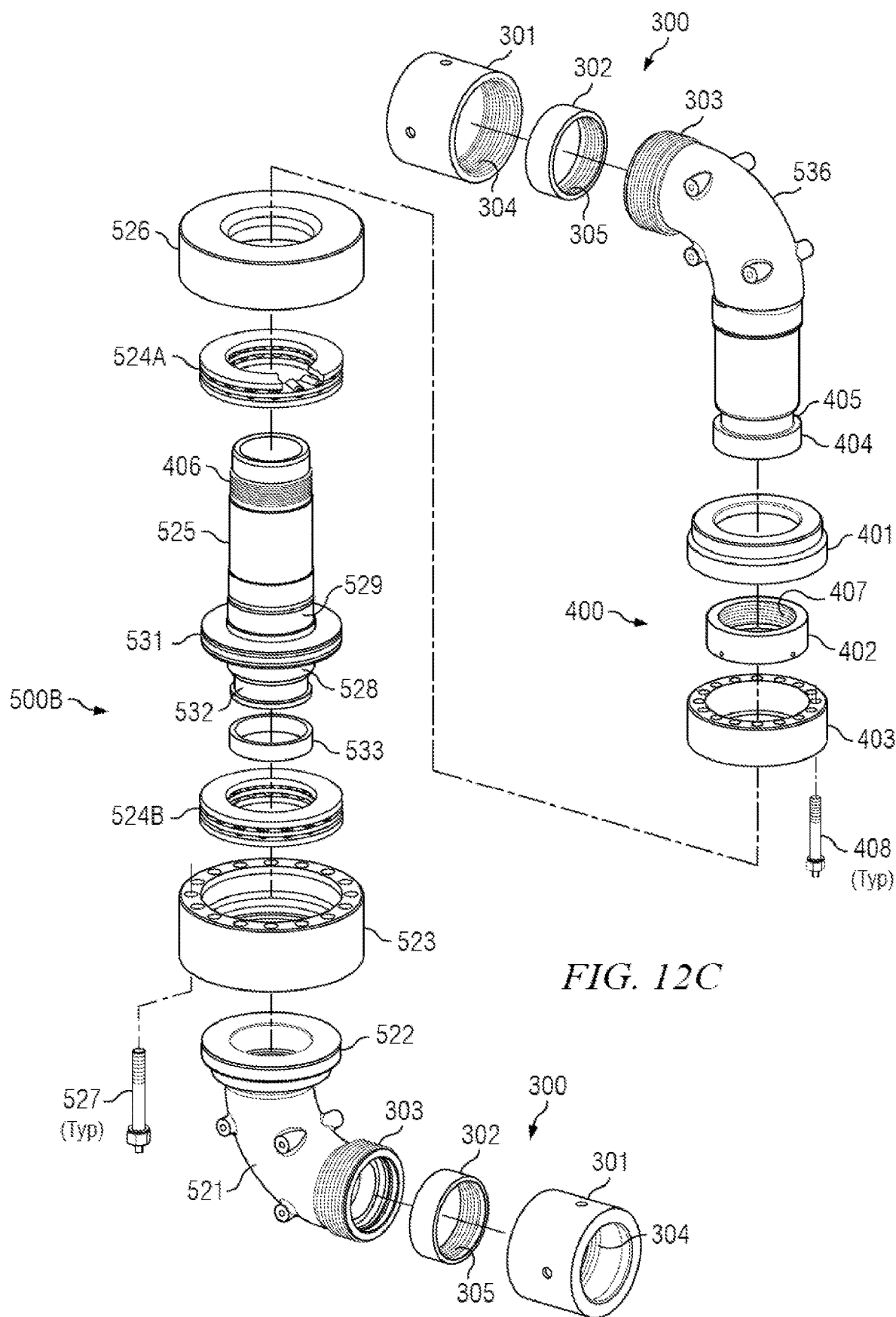

FIG. 12A depicts an exterior view of swivel joint embodiment 500B as fully assembled. FIG. 12B is a section as shown on FIG. 12A. FIG. 12C is an exploded view of FIG. 12A. Looking at FIGS. 12A, 12B and 12C together, swivel joint embodiment 500B includes first elbow 521 with an annular lip 522 provided on a proximal end thereof. When swivel joint 500B is assembled (refer FIGS. 12A and 12B), first housing piece 523 is received over first elbow 521 and is retained by annular lip 522.

With further reference to FIGS. 12A, 12B and 12C together, first and second housing pieces 523, 526 receive rotary bearings 524A and 524B such that rotary bearings 524A, 524B are separated by annular rib 531 formed on a proximal end of integral pin 525. Rotary bearings 524A, 524B will be described in more detail below. Integral pin 525 provides first and second bearing contact surfaces 528, 529 either side of annular rib 531. Rotary bearing 524A is received onto second bearing contact surface 529, and rotary bearing 524B is received onto first bearing contact surface 528. Second housing piece 526 is received over rotary bearing 524A and integral pin 525. First and second housing pieces 523, 526 are rigidly connected together with fasteners 527. Integral pin 525 also has exterior seal groove 532 provided on the proximal end thereof. As fasteners 527 connect first and second housing pieces 523 and 526, exterior seal groove 532 on integral pin 525 is received into annular lip 522 on first elbow 521. Seal ring 533 as received into exterior seal groove 532 forms a rotatable seal between integral pin 525 and first elbow 521 while still allowing independent differential rotation between integral pin 525 and first elbow 521 within swivel joint embodiment 500B.

FIGS. 12A, 12B and 12C each further depict clamp assembly 400 rigidly connecting a distal end of integral pin 525 to a proximal end of second elbow 536. Clamp assemblies 400 are preferably alike throughout this disclosure. Clamp assembly 400 includes an annular fitting lip 404 and an annular fitting groove 405 each provided on a proximal end of a fitting to be clamped to integral pin 525 (e.g. on a proximal end of second elbow 536 per FIGS. 12A, 12B and 12C). First clamp housing piece 401 is received into fitting groove 405. Second clamp housing piece 403 is received over the distal end of integral pin 525. Clamp collet 402 provides internal clamp collet threads 407. Clamp collet 402 rigidly affixes to the distal end of integral pin 525 via threaded engagement of clamp collet threads 407 with integral pin threads 406 provided on the distal end of integral pin 525. The distal end of integral pin 525 is then received into fitting lip 404 such that when first and second clamp housing pieces 401, 403 are rigidly connected with fasteners 408, fitting lip 404 bears down tightly on clamp collet 402. Sealing between integral pin 525 and fitting lip 404 may be provided by conventional o-ring seals or the like.

With further reference to FIGS. 12A, 12B and 12C, it will be understood that clamp assembly 400 is provided to ensure that torque is transmitted into swivel joint embodiment 500B through integral pin 525, so that swivel joint 500B may allow independent differential rotation between first and second elbows 521, 536. By contrast with swivel joint embodiment 500A on FIGS. 11A, 11B and 11C, clamp assembly 400 is not needed on swivel joint embodiment 500A since second elbow 508 transmits torque directly into swivel joint 500A via threaded engagement with swivel collet 505, thereby allowing independent differential rotation between first and second elbows 501, 508.

Looking further now at FIGS. 12A, 12B and 12C together, union assemblies 300 are depicted at the distal ends of each of first and second elbows 521, 536. Union assemblies 300 are preferably alike throughout this disclosure, and are described above in detail with reference to FIGS. 11A, 11B and 11C.

Rotary Bearings Embodiments in Swivel Joint Embodiments 500A and 500B

Currently preferred embodiments of rotary bearings 504A, 504B, 524A, 524B are illustrated in exploded form on FIGS. 11C and 12C. It will be understood that such illustrated embodiments are exemplary only, and that the scope of this disclosure is not limited to the currently preferred rotary bearings embodiments illustrated on FIGS. 11C and 12C. Currently preferred embodiments of rotary bearings 504A, 504B, 524A, 524B are annular thrust bearings, in which a rotary bearing assembly is formed by providing cylindrical roller bearings spaced radially in pockets around an annular plate (cage). The "caged" assembly is then itself interposed between two annular thrust plates (raceways), one above and one below, so that the cylindrical roller bearings in the bearing assembly bear against and roll against the annular thrust plates above and below. Suitable embodiments of rotary bearings 504A, 504B, 524A, 524B as illustrated on FIGS. 11C and 12C may include products available from The Timken Company of North Canton, Ohio, U.S.A., with current preference for model 100TP143. Timken advertises this design to be particularly suited to manage high radial loads even when misalignment, poor lubrication, contamination, extreme speeds or critical application stresses are present. As currently advertised by Timken: "Type TP thrust cylindrical roller bearings have two hardened and ground raceways and a window-type steel cage which retains one or more profiled rollers per pocket. When multiple rollers are used in each pocket, they are different lengths and are placed in staggered position relative to rollers in adjacent pockets to create overlapping roller paths. This minimizes wear of the raceways and therefore increases bearing life. Because of the simplicity of their design, type TP bearings are economical." As noted, however, the scope of this disclosure is not limited to the above-described style of rotary bearings or to Timken® models.

Spatial Positioning of Fluid Delivery Unit (FDU) 100

FIGS. 6 and 7 depict spatial positioning aspects as deployed on currently preferred embodiments of FDU 100. As depicted on FIGS. 6 and 7, spatial positioning is a mode of user-operated remote control of FDU 100, in which, for example, fluid connection adapter 900 at a distal end of FDU 100 may be directed to be received into fluid connection housing assembly 950 on a desired target wellhead $W_T$. It will be understood that spatial positioning of FDU 100 under guidance of remote control is an optional feature in accordance with this disclosure. Other embodiments may provide FDU 100 without the remote-controlled spatial positioning feature, in which case FDU 100 may be operated and positioned via conventional manual hydraulic controls. The scope of this disclosure is not limited to FDU 100 embodiments that deploy remote-controlled spatial positioning.

Focusing momentarily on currently preferred FDU 100 embodiments that deploy remote-controlled spatial positioning, FIG. 7 shows that currently preferred FDU 100 embodiments deploy remote user operation via a remotely-operated controller 200 communicating wirelessly with FDU 100. FIG. 7 illustrates how the user of such a remotely-operated controller 200 may stand in a safe area that allows good visibility of target wellhead $W_T$, facilitating precise connection between fluid connection adapter 900 and fluid connection housing assembly 950 via remote control operation of FDU 100.

Such wireless communication may preferably be via radio frequency communication RF as shown on FIG. 7, although the scope of this disclosure is not limited in this regard. FIG. 8 depicts one exemplary embodiment of controller 200, as shown generally on FIG. 7. FIG. 8's embodiment of controller 200 is described below in detail in a separate section of this disclosure. It will be nonetheless understood that the scope of this disclosure includes many different embodiments of controller 200 on FIG. 7 (including different layouts, features, modes and functionalities).

It will be further understood that FDU 100 embodiments that deploy spatial positioning are not limited to user operation via remote control. In other embodiments (not illustrated), may provide spatial positioning controls (including different layouts, features, modes and functionalities) deployed directly on truck trailer T or FDU superstructure 101, for example.

Referring now to FIG. 6, currently preferred embodiments of FDU 100 provide axes of rotation A1 through A5. As described elsewhere in greater detail in this disclosure, a slew drive is configured to actuate rotation about at least one of axes A[1 . . . 5], and a piston is configured to actuate rotation about at least one of axes A[1 . . . 5]. Rotation about axes A1 through A5 are defined as follows in such preferred embodiments:

A1—Rotation of turret 102 about FDU superstructure 101 (vertical axis);
A2—Rotation of turret end 103T of first boom section 103 about turret 102 (horizontal axis);
A3—Rotation of turret end 104T of second boom section 104 about stinger end 103S of first boom section 103 (horizontal axis);
A4—Rotation of stinger assembly 600 about stinger end 104S of second boom section 104 (horizontal axis); and
A5—Further rotation of stinger assembly 600 (horizontal axis).

It will be appreciated that axes of rotation A4 and A5 are in orthogonal planes to one another. In this way, according to the embodiment illustrated on FIG. 6, rotation of FDU 100 components about axes A1 though A5 bring about the following motions of fluid connection adapter 900 with respect to fluid connection housing assembly 950 on target wellhead $W_T$:

A1—Set target azimuth for fluid connection adapter 900 towards target wellhead $W_T$
A2—Elevate/lower and extend/retract fluid connection adapter 900 along target azimuth
A3—Further elevate/lower and extend/retract fluid connection adapter 900 along target azimuth
A4—Rotate (tilt) fluid connection adapter 900 in parallel plane to target azimuth
A5—Rotate (tilt) fluid connection adapter 900 in orthogonal plane to target azimuth It will be thus seen with reference to FIG. 6 that establishment of a directional bearing B1 through B5 on each of a corresponding one of axes A1 through A5 will collectively define a point in space for fluid connection adapter 900 within FDU 100's reach. It therefore follows that a set of values $B_{VAL}[1 . . . 5]$ ascribed to each of directional bearings B1 through B5 will define the current spatial position for FDU 100, and in particular for fluid connection adapter 900. It further follows that a different set of values $B_{VAL}[1 . . . 5]$ ascribed to each of directional bearings B1 through B5 will define a corresponding spatial positon for a target for fluid connection adapter 900 on FIG. 6, such as fluid connection housing assembly 950 on target wellhead $W_T$.

Figure 13C:
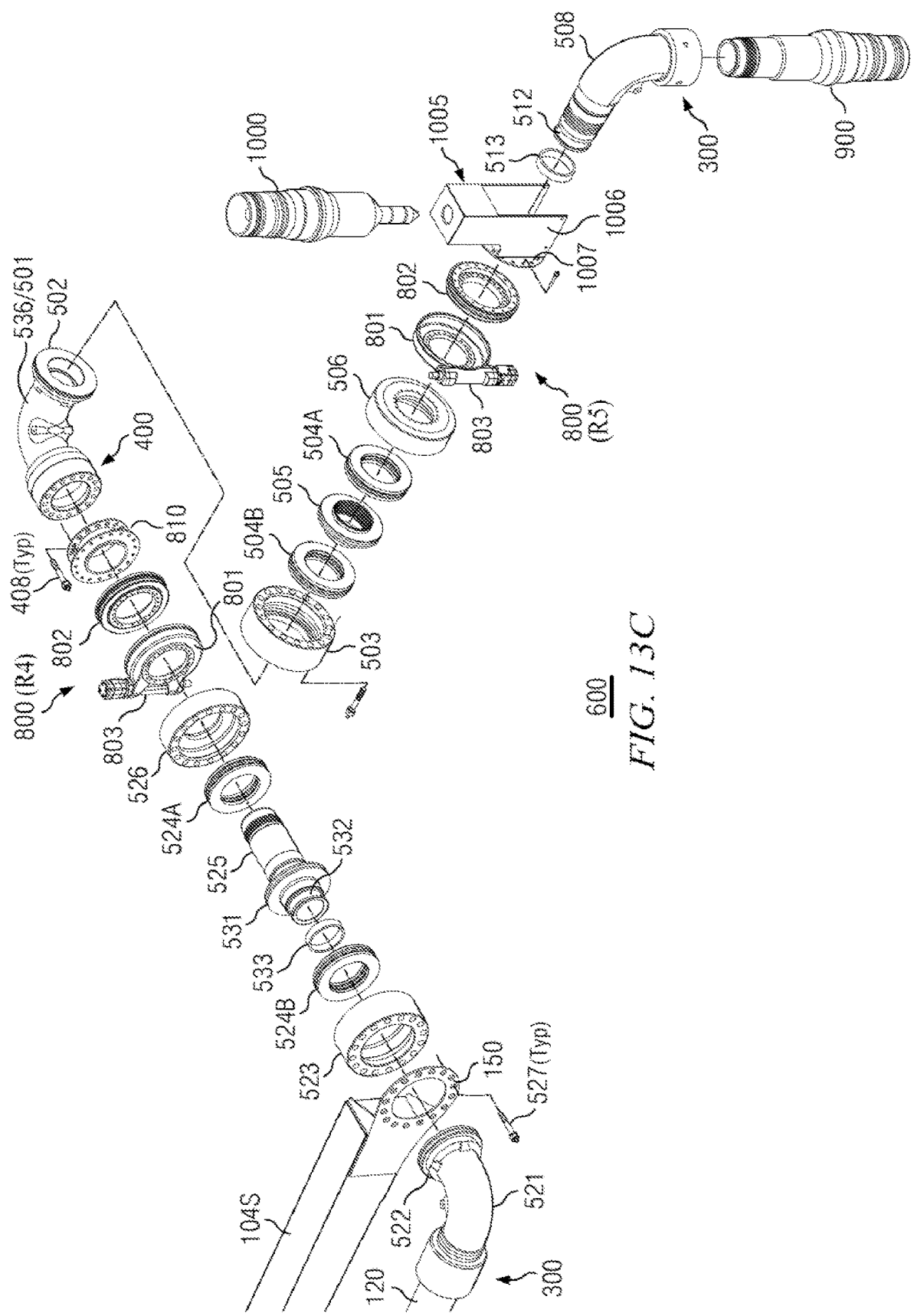
FIG. 13C is an exploded view of FIG. 13A.

Illustrated embodiments of FDU 100 further include a plurality of rotary encoders R1 through R5, one rotary encoder deployed at each of a corresponding one of axes A1 through A5, such that each rotary encoder is configured to measure a corresponding one of directional bearings B1 through B5 to establish sets of measured bearings values $B_{VAL}[1 . . . 5]$. As described immediately above, sets of $B_{VAL}[1 . . . 5]$ define corresponding spatial positions for FDU 100. Looking now at FIG. 7 alongside FIG. 6, FIG. 7 illustrates rotary encoders R1 through R3 provided at each of a corresponding one of axes A1 through A3. Rotary encoders R1 through R3 measure current values $B_{VAL}[1 . . . 3]$ of directional bearings B1 through B3 at each of a corresponding one of axes A1 through A3. It will be understood that stinger assembly 600 on FIG. 7 provides rotary encoders R4 and R5 at axes A4 and A5, respectively, for measurement of current values $B_{VAL}[4, 5]$ of directional bearings B4 and B5, respectively. Rotary encoders R4, R5 are omitted for clarity on FIG. 7, but are illustrated on FIGS. 13A, 13B and 13C, for example. FIGS. 13A, 13B and 13C illustrate stinger assembly 600 in more detail. This disclosure describes stinger assembly 600 (including rotary encoders R4, R5 as shown on FIGS. 13A, 13B and 13C) in detail further below in a separate section. Suitable embodiments of rotary encoders R1 through R5 may include products available from Turck, Inc. of Minneapolis, Minn., U.S.A., although the scope of this disclosure is not limited in this regard.

FIG. 7 also illustrates currently preferred FDU 100 embodiments in which turret slew drive 110 is deployed on FDU superstructure 101. Turret slew drive 110 rotates turret 102. Turret slew drive 110 is conventional in preferred embodiments, in which at least one spur gear is provided to engage and drive annular gears on turret 102 so as rotate turret 102 about axis A1. FIG. 7 depicts rotary encoder R1 deployed in association with turret slew drive 110 as is also known in the art. Rotary encoder R1 measures a current rotational position for turret 102 about axis A1 so as to establish a current directional bearing B1 about axis A1. Rotary encoder R1 then transmits the current directional bearing B1 in real time to storage, memory and/or a data processing unit as a data element used in overall control of FDU 100.

Rotary encoder R2 on FIG. 7 measures rotation at axis A2 so as to establish a current directional bearing B2 at axis A2. It will be recalled from earlier disclosure with respect to FIG. 5 that turret 102 connects rotatably to turret end 103T of first boom section 103 to establish axis A2. FIG. 7 shows that extension and retraction of first boom piston 105A actuates rotation about axis A2. Rotary encoder R2 measures a current rotational position for first boom section 103 about axis A2 so as to establish a current directional bearing B2 about axis A2. Rotary encoder R2 then transmits the current directional bearing B2 in real time to storage, memory and/or a data processing unit as a data element used in overall control of FDU 100.

Rotary encoder R3 on FIG. 7 measures rotation at axis A3 so as to establish a current directional bearing B3 at axis A3. It will be recalled from earlier disclosure with respect to FIG. 5 that stinger end 103S of first boom section 103 connects to turret end 104T of second boom section 104 to establish axis A3. FIG. 7 shows that extension and retraction of second boom piston 105B actuates rotation about axis A3. Rotary encoder R3 measures a current rotational position for second boom section 104 about axis A3 so as to establish a current directional bearing B3 about axis A3. Rotary encoder R3 then transmits the current directional bearing B3 in real time to storage, memory and/or a data processing unit as a data element used in overall control of FDU 100.

Rotary encoder R4 within slew drive 800(R4) on FIGS. 13B and 13C measures rotation at axis A4 so as to establish a current directional bearing B4 at axis A4. FIG. 6 depicts a connection between stinger end 104S of second boom section 104 and stinger assembly 600 to establish axis A4. As shown in more detail on FIGS. 13B and 13C, stinger assembly 600 includes slew drive 800(R4) at axis A4. Actuation of slew drive 800(R4) at axis A4 is described in detail further below with reference to FIGS. 13A, 13B and 13C in a separate section of this disclosure. Rotary encoder R4 within slew drive 800(R4) measures a current rotational position for stinger assembly 600 about axis A4 so as to establish a current directional bearing B4 about axis A4. Rotary encoder R4 then transmits the current directional bearing B4 in real time to storage, memory and/or a data processing unit as a data element used in overall control of FDU 100.

Rotary encoder R5 within slew drive 800(R5) on FIGS. 13B and 13C measures rotation at axis A5 so as to establish a current directional bearing B5 at axis A5. FIG. 6 depicts axis A5 on stinger assembly 600, where axis A5 is in an orthogonal plane to axis A4. As shown in more detail on FIGS. 13B and 13C, stinger assembly 600 includes slew drive 800(R5) at axis A5. Actuation of slew drive 800(R5) at axis A5 is described in detail further below with reference to FIGS. 13A, 13B and 13C in a separate section of this disclosure. Rotary encoder R5 within slew drive 800(R5) measures a current rotational position for stinger assembly 600 about axis A5 so as to establish a current directional bearing B5 about axis A5. Rotary encoder R5 then transmits the current directional bearing B5 in real time to storage, memory and/or a data processing unit as a data element used in overall control of FDU 100.

In some embodiments, such as those illustrated on FIG. 7, FDU 100 provides first inclinometer I1 deployed, for example, on FDU superstructure 101. Suitable embodiments of first inclinometer I1 may include products available from Axiomatic Technologies Corporation of Mississauga, Ontario, Canada, although the scope of this disclosure is not limited in this regard. First inclinometer I1 is configured to correct sets of $B_{VAL}[1 \ldots 5]$ for FDU 100 being "out of level". More specifically, first inclinometer I1 is configured to measure, quantitatively, the degree to which FDU 100 stands "out of level" in its current jobsite position. First inclinometer I1 may send this "out of level" information to storage, memory and/or a data processing unit. The "out of level" information from first inclinometer I1 may be used to correct current measured bearings values $B_{VAL}[1 \ldots 5]$, as measured by rotary encoders R1 through R5, for corresponding "out of level" variances at axes A1 through A5. In some embodiments, first inclinometer I1 may also be configured to send alarm information when first inclinometer I1 detects that FDU may be becoming unstable, (i.e. "tipping").

Exemplary operation and control sequences will now be described to give an understanding of spatial positioning on FDU 100 according to preferred embodiments hereof. In such preferred embodiments, the following operation and control sequences may be initiated and executed using controller 200 as illustrated on FIGS. 7 and 8. As previously noted, however, the scope of this disclosure is not limited to operation and control of FDU 100 using controller 200 embodiments illustrated on FIGS. 7 and 8.

With reference to FIGS. 6 and 7, a user may desire to operate FDU 100 with the goal of inserting fluid connection adapter 900 into fluid connection housing assembly 950 on target wellhead $W_T$. The user may accomplish this goal, for example, by a combination of: (1) actuating turret slew drive 110 to rotate turret 102 to set a target azimuth for fluid connection adapter 900 towards fluid connection housing assembly 950 on target wellhead $W_T$; and (2) actuating first and second boom pistons 105A, 105B to elevate/lower and extend/retract fluid connection adapter 900 along the target azimuth until fluid connection adapter 900 is positioned generally above fluid connection housing assembly 950.

Referring now to FIGS. 13A and 13B, for example, the user may now actuate slew drive 800(R4) at axis A4 and slew drive 800(R5) at axis A5 to set fluid connection adapter 900 in a plumb vertical attitude directly above fluid connection housing assembly 950. Further small adjustments to turret slew drive 110 and first and second boom pistons 105A, 105B may also assist with setting fluid connection adapter 900 in the desired plumb vertical attitude.

Figure 14A:
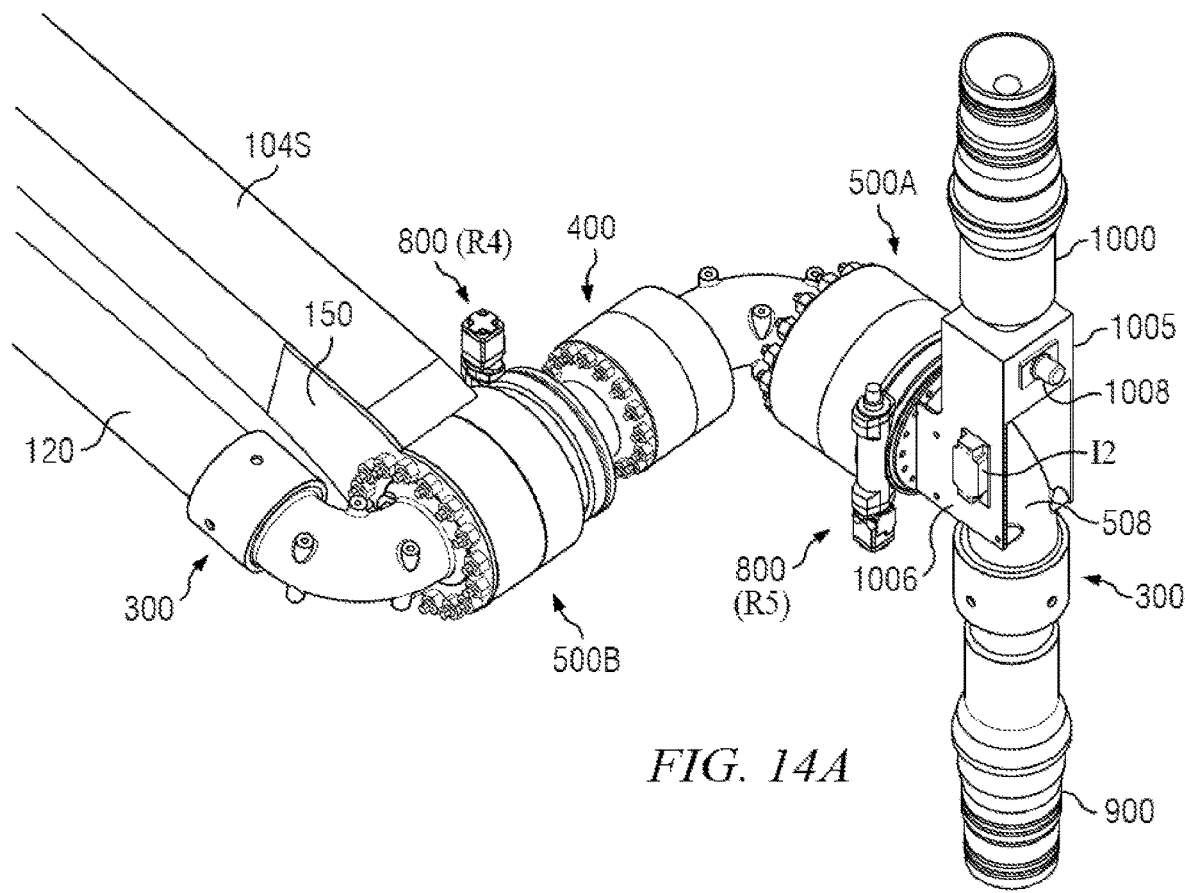
FIGS. 14A, 14B and 14C illustrate a currently preferred embodiment of nightcap 1000 and its associated features.

In some embodiments, such as illustrated on FIG. 7, stinger assembly provides second inclinometer 12 on stinger assembly 600. Suitable embodiments of second inclinometer 12 may include products available from Axiomatic Technologies Corporation of Mississauga, Ontario, Canada, although the scope of this disclosure is not limited in this regard. FIG. 14A shows second inclinometer 12 advantageously deployed on nightcap bracket face 1006, for example, although the scope of this disclosure is not limited in this regard. In currently preferred embodiments on which second inclinometer 12 is deployed, second inclinometer 12 is configured to maintain fluid connection adapter 900 in a constant plumb vertical attitude during motion of FDU 100. More specifically, second inclinometer 12 is configured to measure, quantitatively, the degree to which fluid connection adapter 900 is currently "out of plumb vertical" as the user actuates turret slew drive 110 and first and second boom pistons 105A, 105B to move fluid connection adapter 900 towards a desired target. Second inclinometer 12 may send this "out of plumb vertical" information to storage, memory and/or a data processing unit. The "out of plumb vertical" information from second inclinometer 12 may be used to make corresponding automated adjustments to slew drives 800(R4) and 800(R5) to maintain fluid connection adapter 900 in a constant plumb vertical attitude regardless of the current motion of other FDU 100 components. In embodiments deploying second inclinometer 12, therefore, the user may, for example, move fluid connection adapter 900 directly above a fluid connection housing assembly 950 with fluid connection adapter 900 already set in the desired plumb vertical attitude.

In other embodiments, second inclinometer 2 may be configured to maintain fluid connection adapter 900 in a constant attitude other than plumb vertical. The scope of this disclosure is not limited in this regard. For example, it may be known that a target wellhead $W_T$ is a specific rotational amount out of plumb vertical along a particular azimuth. In such cases, second inclinometer 2 may be configured to maintain fluid connection adapter 900 in a corresponding rotational amount out of plumb vertical along a corresponding azimuth. As a result, insertion of fluid connection adapter 900 into fluid connection housing assembly 950 on target wellhead $W_T$ is facilitated.

It will now be appreciated that the current set of directional bearing values $B_{VAL}[1 \ldots 5]$, as measured by rotary encoders R1 through R5 on corresponding axes A1 through A5, represents the current spatial position of fluid connection adapter 900. In some embodiments, the user may now instruct FDU 100 to "learn" the current spatial position of fluid connection adapter 900 by storing the current set of values $B_{VAL}[1 \ldots 5]$ for directional bearings B1 through B5 for fluid connection adapter 900 as currently spatially positioned in a plumb vertical attitude directly above fluid connection housing assembly 950.

The user may then insert fluid connection adapter 900 into fluid connection housing assembly 950 by making further small adjustments to first and second boom pistons 105A, 105B to lower fluid connection adapter 900 until received in fluid connection housing assembly 950. Fluid connection adapter 900 may then be locked into fluid connection housing assembly 950, forming a pressure seal therebetween, and FDU 100 may commence fluid delivery to target wellhead $W_T$.

When fluid delivery is complete, fluid connection adapter 900 may be released from fluid connection housing assembly 950. The user may now operate FDU 100 to withdraw fluid connection adapter 900 from current target wellhead $W_T$. The user may then, consistent with immediately prior disclosure, move fluid connection adapter 900 towards a new target wellhead $W_T$ within range for fluid delivery thereto. Further, also consistent with immediately prior disclosure, the user may instruct FDU 100 to "learn" the current spatial position of fluid connection adapter 900 at the new target wellhead $W_T$ when fluid connection adapter 900 is spatially positioned in a plumb vertical attitude directly above fluid connection housing assembly 950 on the new target wellhead $W_T$.

It will thus be appreciated that in preferred embodiments, the user may direct FDU 100 to "return" to previously-visited target wellheads $W_T$, where FDU 100 has previously stored a set of values $B_{VAL}[1 \ldots 5]$ for directional bearings B1 through B5 corresponding to fluid connection adapter 900's spatial position above each of such previously-visited target wellheads $W_T$. It will be recalled that FDU 100 is configured to store and recall sets of $B_{VAL}[1 \ldots 5]$, and that FDU 100 is further configured to robotically take up a corresponding spatial position when directed to recall a previously-stored set of $B_{VAL}[1 \ldots 5]$. Thus, the user may direct FDU 100 to "recall" a previously-stored set of directional bearings values $B_{VAL}[1 \ldots 5]$ corresponding to a desired previously-visited target wellhead $W_T$. Conventional data processing capability then robotically actuates turret slew drive 110, first and second boom pistons 105A, 105B, and slew drives 800(R4) and 800(R5) so that FDU 100 robotically takes up the spatial position corresponding to the recalled set of directional bearings values $B_{VAL}[1 \ldots 5]$. This robotic actuation causes FDU 100 to move fluid connection adapter 900 to the previously-stored spatial position above the currently desired (and previously-visited) target wellhead $W_T$.

It will be further appreciated that, consistent with the broader scope of this disclosure, a user may direct FDU 100 to "learn" and then "return" robotically to any desired spatial position within reach. The scope of this disclosure is not limited in this regard. For example, in another embodiment discussed further below, the user may instruct FDU 100 to take up, robotically, a previously-stored "fold" spatial position in which FDU 100 is folded for transport.

It will also be understood that the foregoing automated and robotic FDU 100 functionality may be embodied on software or firmware executable by conventional data processing architecture including memory, storage and processors. Referring momentarily to FIG. 7, such conventional data processing architecture may be deployed/distributed on FDU 100, or on controller 200, or elsewhere, and the scope of this disclosure is not limited to any particular enabling data processing architecture or the manner in which it is deployed on or distributed about FDU 100 generally.

This disclosure's description of spatial positioning has been, up to this point, with reference to currently preferred embodiments as illustrated on FIGS. 6 and 7. As noted above, such currently preferred embodiments include FDU configured with turret 102, first and second boom sections 103, 104 and stinger assembly 600. Independent rotation of these components with respect to one another on illustrated axes of rotation A1 through A5 allows measured or ordained spatial positioning of hardware located at a distal end of FDU 100. The scope of this disclosure is not limited, however, to spatial positioning according to the currently preferred embodiments illustrated on FIGS. 6 and 7 and described immediately above. The preferred illustrated and described embodiments herein are exemplary only. It will be appreciated that consistent with the more general scope of this disclosure, FDU 100 may include a turret and a stinger assembly separated by a plurality of concatenated boom sections S[1 . . . N], in which adjacent boom sections are connected via rotatable connections, and where N is a preselected number of boom sections according to the desired level of controllability of FDU 100. In such embodiments, (1) each boom section has a turret end and a stinger end; (2) the turret end of boom section S[1] is rotatably connected to the turret; (3) the stinger end of one boom section S[1 . . . N−1] is rotatably connected to the turret end of an adjacent boom section S[2 . . . N]; and (4) the stinger end of boom section S[N] is rotatably connected to the stinger assembly.

In such broader embodiments, rotation of the turret defines rotation about an axis A[1] on a directional bearing B[1]; rotation of the turret end of boom section S[1] about the turret defines rotation about an axis A[2] on a directional bearing B[2]; rotation of the turret end of one boom section S[2 . . . N] about the stinger end of an adjacent boom section S[1 . . . N−1] defines rotation about a corresponding axis A[3 . . . N+1] on a corresponding directional bearing B[3 . . . N+1]; and rotation of the stinger assembly about the stinger end of boom section S[N] defines rotation about an axis A[N+2] on a corresponding directional bearing B[N+2].

In further embodiments, again consistent with the more general scope of this disclosure, the stinger assembly may be further configured to rotate about Q additional rotational axes A[N+3 . . . N+2+Q] each on a corresponding directional bearing B[N+3 . . . N+2+Q]. FDU 100 further includes a plurality of rotary encoders R[1 . . . N+2+Q], one rotary encoder deployed at each of a corresponding one of axes A[1 . . . N+2+Q] such that each rotary encoder is configured to measure a corresponding one of directional bearings B[1 . . . N+2+Q] to establish sets of measured directional bearings values $B_{VAL}[1 \ldots N+2+Q]$, wherein sets of $B_{VAL}[1 \ldots N+2+Q]$ define corresponding spatial positions for FDU 100. FDU 100 may be configured to store and recall sets of $B_{VAL}[1 \ldots N+2+Q]$, and further configured to robotically take up a corresponding spatial position when directed to recall a previously-stored set of $B_{VAL}[1 \ldots N+2+Q]$. As described elsewhere in greater detail in this disclosure, a slew drive is configured to actuate rotation about at least one of axes A[1 . . . N+2+Q], and a piston is configured to actuate rotation about at least one of axes A[1 . . . N+2+Q].

The general scope of this disclosure further includes embodiments in which stinger assembly 600 is not configured to rotate about additional axes beyond axis A4 as illustrated on FIGS. 6 and 7. In such embodiments, FDU 100 may include a turret and a stinger assembly separated by first and second boom sections in which the boom sections are concatenated via a rotatable connection. Each boom section has a turret end and a stinger end, the turret end of the first boom section is rotatably connected to the turret; and the stinger end of the second boom section is rotatably connected to the stinger assembly. Rotation of the turret defines rotation about an axis A1 on a directional bearing B1, rotation of the turret end of the first boom section about the turret defines rotation about an axis A2 on a directional bearing B2, rotation of the turret end of the second boom section about the stinger end of the first boom section defines rotation about an axis A3 on a corresponding directional bearing B3, and rotation of the stinger assembly about the stinger end of the second boom section defines rotation about an axis A4 on a corresponding directional bearing B4. In such embodiments, FDU 100 further includes a plurality of rotary encoders R[1 . . . 4], one rotary encoder deployed at each of a corresponding one of axes A[1 . . . 4] such that each rotary encoder is configured to measure a corresponding one of directional bearings B[1 . . . 4] to establish sets of measured bearings values $B_{VAL}[1 \ldots 4]$. Sets of $B_{VAL}[1 \ldots 4]$ define corresponding spatial positions for FDU 100. Similar to embodiments illustrated on FIGS. 6 and 7, FDU 100 may be configured to store and recall sets of $B_{VAL}[1 \ldots 4]$, and FDU 10 may be further configured to robotically take up a corresponding spatial position when directed to recall a previously-stored set of $B_{VAL}[1 \ldots 4]$.

Referring to the immediately preceding paragraph, it will be further appreciated that consistent with the more general scope of this disclosure, embodiments of FDU 100 may further include a turret and a stinger assembly separated by a plurality of concatenated boom sections S[1 . . . N], in which adjacent boom sections are connected via rotatable connections, and where N is a preselected number of boom sections according to the desired level of controllability of FDU 100. In such embodiments, (1) each boom section has a turret end and a stinger end; (2) the turret end of boom section S[1] is rotatably connected to the turret; and (3) the stinger end of one boom section S[1 . . . N−1] is rotatably connected to the turret end of an adjacent boom section S[2 . . . N].

In such broader embodiments, rotation of the turret defines rotation about an axis A[1] on a directional bearing B[1]; rotation of the turret end of boom section S[1] about the turret defines rotation about an axis A[2] on a directional bearing B[2]; rotation of the turret end of one boom section S[2 . . . N] about the stinger end of an adjacent boom section S[1 . . . N−1] defines rotation about a corresponding axis A[3 . . . N+1] on a corresponding directional bearing B[3 . . . N+1]; and rotation of the stinger assembly about the stinger end of boom section S[N] defines rotation about an axis A[N+2] on a corresponding directional bearing B[N+2].

FDU 100 further includes a plurality of rotary encoders R[1 . . . N+2], one rotary encoder deployed at each of a corresponding one of axes A[1 . . . N+2] such that each rotary encoder is configured to measure a corresponding one of directional bearings B[1 . . . N+2] to establish sets of measured directional bearings values $B_{VAL}[1 \ldots N+2]$, wherein sets of $B_{VAL}[1 \ldots N+2]$ define corresponding spatial positions for FDU 100. FDU 100 may be configured to store and recall sets of $B_{VAL}[1 \ldots N+2]$, and further configured to robotically take up a corresponding spatial position when directed to recall a previously-stored set of $B_{VAL}[1 \ldots N+2]$.

Controller 200

As described above with reference to FIG. 7, preferred embodiments of the disclosed fluid delivery system include remote control of the operation of FDU 100. In such embodiments, control is preferably via a remote manual controller 200, in which controller 200 preferably communicates with FDU 100 wirelessly via radio frequency communication RF (although the scope of this disclosure is not limited to such embodiments and preferences). In illustrated embodiments, controller 200 is configured, via wireless communication, to allow a user to perform several activities, including at least one activity selected from the group consisting of: (a) actuating rotation about selected ones of axes A[1 . . . 5]; (b) deploying a nightcap 1000 positioned on the stinger assembly 600; and (c) storing and recalling sets of $B_{VAL}[1 \ldots 5]$.

Figure 8:
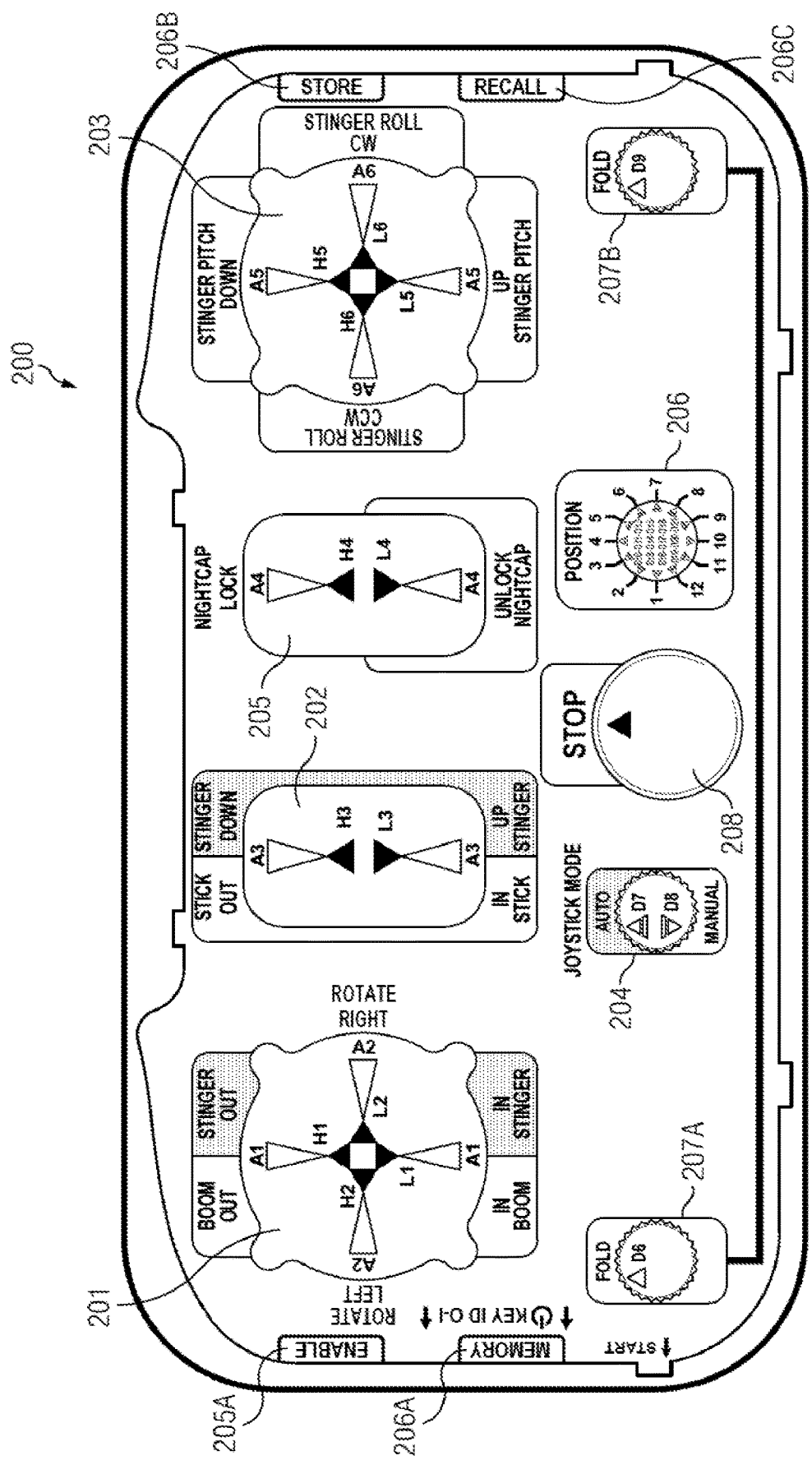
FIG. 8 illustrates a currently preferred embodiment of controller 200.

FIG. 8 illustrates a currently preferred embodiment of controller 200. It will be understood that the embodiment of controller 200 depicted on FIG. 8 is exemplary only, and numerous other alternative layouts of features and functions are within the scope of this disclosure. It will be further understood with reference to FIG. 8 that alphanumeric references on controller 200 such as "A1", "H2", "L3", "D4" are on-board short hand notations, marked on controller 200 solely to refer to corresponding controller operations used in actual operation of FDU 100. Such alphanumerics have no relation, however, to similar part numbers used in this disclosure to indicate items on this disclosure's Figures. Thus, by way of example, "A1" on controller 200 on FIG. 8 refers solely to an internal controller operation only, and has no relation to this disclosure's description above of axis A1 above with reference to FIG. 6.

Referring to FIG. 8, the illustrated embodiment of controller 200 includes boom joysticks 201, 202 and 203. Controller 200 further includes joystick mode selector 204. Boom joysticks 201, 202, 203 are all active when joystick mode selector 204 is set to MANUAL. Manual joystick mode allows independent control of rotary motion about each of axes A1 through A5 illustrated on FIG. 6. Manual joystick mode thus allows higher skill operators to control movement of FDU 100 entirely by manual joystick operation.

By contrast, only boom joysticks 201 and 202 are active when joystick mode selector 204 is set to AUTO. In auto joystick mode, operation of joysticks 201, 202 switches from rotary motion about axes A1 through A5 (per manual joystick mode described immediately above) to an X/Y/Z coordinate system, or to a left/right, in/out, and up/down command system based on joystick movement. This allows lower skill operators to operate FDU 100 with more simplicity.

Controller 200 on FIG. 8 further includes nightcap joystick 205 and nightcap enable switch 205A. Nightcap 1000 is described in more detail in this disclosure below with reference to FIGS. 14A, 14B and 14C. Moving nightcap joystick 205 on FIG. 8 to the NIGHTCAP LOCK position activates nightcap engage/release mechanism 1008 on FIG. 14C to engage on nightcap engagement pin 1009 when desiring, for example, to pull nightcap 1000 from wellhead W. Engaging on nightcap 1000 does not require use of nightcap enable switch 205A on FIG. 8. Moving nightcap joystick 205 on FIG. 8 to the UNLOCK NIGHTCAP position, however, also requires simultaneous pushing of nightcap enable switch 205A (on left side of controller 200) in order to activate nightcap engage/release mechanism 1008 on FIG. 14C to release nightcap engagement pin 1009. This feature enhances safe removal of nightcap 1000 from nightcap engage/release mechanism 1008 on FIG. 14C by reducing chances of an accidental nightcap release, for example.

As described above with reference to FIGS. 6 and 7, currently preferred embodiments of FDU 100 include a feature that allows FDU 100 to "learn" a desired spatial position by storing a set of measured values $B_{VAL}[1 \ldots 5]$ for directional bearings B1 through B5 on corresponding axes A1 through A5 (refer FIG. 6) where the set of measured directional bearing values $B_{VAL}[1 \ldots 5]$ represents the "learned" spatial position. Such "learned" spatial positions may include, for example, FDU 100's spatial position when delivering fluid to a selected wellhead. Memory within controller 200 may store sets of measured values $B_{VAL}[1 \ldots 5]$ for directional bearings B1 through B5 corresponding to such "learned" spatial positions. FDU 100 may then, for example, return to the selected wellhead by retrieving the set of directional bearings values $B_{VAL}[1 \ldots 5]$ from controller 200's memory corresponding to the previously-stored spatial position for the wellhead.

FIG. 8 illustrates controller 200 including stored position selector 206 for selecting a desired FDU 100 spatial position to be addressed. Up to 12 (twelve) previously-stored positions may be stored in memory in the embodiment of controller 200 depicted on FIG. 8. The scope of this disclosure is not limited in this regard, however.

To store a current FDU 100 spatial position, stored position selector 206 is turned to select the memory location in which the current FDU 100 spatial position is desired to be stored. Pushing memory activate switch 206A (on left side of controller 200) simultaneously with pushing store activate switch 206B (on right side of controller 200) will cause controller 200 to store the current FDU 100 spatial position in the selected memory location.

To recall a previously-stored FDU 100 spatial position, stored position selector 206 is turned to select the memory location in which the desired previously-stored FDU 100 spatial position stored. Pushing memory activate switch 206A (on left side of controller 200) simultaneously with pushing recall activate switch 206C (on right side of controller 200) causes FDU 100 to move robotically to return to the spatial position previously stored in the selected memory location. As a safety precaution, FDU 100 advantageously moves only so long as both the memory activate switch 206A and the recall activate switch 206C are being actively pushed concurrently. Robotic FDU 100 motion stops if either switch is released. Controller 200 advantageously also performs additional safety checks prior to moving FDU 100 automatically, such as checking boom height and clearance.

FIG. 8 illustrates controller 200 further including fold mode selectors 207A and 207B. Controller 200's memory also stores a preset "fold" spatial position in which FDU 100 is folded for transport. Activating fold mode selectors 207A and 207B simultaneously moves FDU 100 robotically the preset "fold" spatial position. Again, as a safety precaution, FDU 100 advantageously moves only so long as both fold mode selectors 207A and 207B are activated. Robotic FDU 100 motion stops if either of fold mode selectors 207A or 207B is deactivated.

FIG. 8 illustrates controller 200 further including emergency stop activator 208. Activating emergency stop activator 208 causes all current motion of FDU 100 to stop immediately, and disables all further FDU 100 motion until emergency stop activator is affirmatively deactivated or reset.

Stinger Assembly 600 (and Actuation of Rotation Thereof about Second Boom Section 104)

As described above, FIG. 6 depicts stinger assembly 600 connected to stinger end 104S of second boom section 104 via a rotating connection. FIG. 6 further depicts fluid connection adapter 900 deployed on stinger assembly 600. As shown on FIG. 6, the rotating connection between stinger end 104S of second boom section 104 and stinger assembly 600 is at axis A4. As further shown on FIG. 6, stinger assembly 600 also provides rotation about axis A5, where rotation about axis A5 is in an orthogonal plane to rotation about axis A4. FIGS. 13A, 13B and 13C illustrate currently preferred embodiments of stinger assembly 600 in detail.

FIG. 13A is general arrangement view of assembled stinger assembly 600. FIG. 13B is a section as shown on FIG. 13A, and FIG. 13C is an exploded view of FIG. 13A. FIGS. 13A, 13B and 13C also illustrate nightcap 1000 generally. Nightcap 1000 is described in detail below with reference to FIGS. 14A, 14B and 14C in a separate section of this disclosure.

Looking at FIGS. 13A, 13B and 13C together, swivel joint embodiment 500B is rigidly connected to stinger end 104S of second boom section 104 via boom flange 150. In preferred embodiments, boom flange may be welded to second boom section 104, although the scope of this disclosure is not limited to any particular rigid connection of boom flange 150 to second boom section 104. Boom flange 150 is further preferably attached to swivel joint 500B via fastener attachment to first housing piece 523. In some embodiments, boom flange 150 may share fasteners 527 with first housing piece 523.

FIGS. 13A, 13B and 13C further show first elbow of swivel joint embodiment 500B rigidly connected to delivery piping 120 via union assembly 300, all as described above more generally with reference to FIGS. 12A through 12C. Swivel joint 500B on FIGS. 13A through 13C also includes clamp assembly 400 for rigid connection with second elbow 536, all again as described above more generally with reference to FIGS. 12A through 12C.

FIGS. 13A, 13B and 13C further show first elbow 501 of swivel joint embodiment 500A rigidly connected to swivel embodiment 500B. It will be appreciated that in the preferred embodiments illustrated on FIGS. 13A through 13C, second elbow 536 on swivel joint 500B and first elbow 501 on swivel joint 500A are the same fitting, obviating the need for connection pipe between swivel joints 500A, 500B. The scope of this disclosure is not limited in this regard, however. Second elbow 508 on swivel joint 500A is rigidly connected to fluid connection adapter 900, preferably via union assembly 300 as described above more generally with reference to FIGS. 11A through 11C.

FIGS. 13B and 13C show slew drive 800(R4) deployed on swivel joint embodiment 500B and slew drive 800(R5) deployed on swivel joint embodiment 500A. Slew drives 800(R4) and 800(R5) are conventional in preferred embodiments. FIG. 13C shows slew drives 800(R4) and 800(R5) each including a fixed portion 801, and a rotating portion 802 driven by worm drive 803. Worm drives 803 each include a rotary encoder (R4 and R5) respectively. In more detail, worm drives 803 each include a hydraulically-driven worm gear motor plus a rotary encoder on board. The rotary encoder may measure current rotary displacement or set a desired rotary displacement corresponding to directional bearings B4 or B5, as applicable. Suitable embodiments of slew drives 800(R4) and 800(R5) may include products available from Cone Drive Operations, Inc. of Traverse City, Mich., U.S.A., although the scope of this disclosure is not limited in this regard. It will also be appreciated that the scope of this disclosure is not limited to use of slew drives. The scope of this disclosure also includes non-illustrated embodiments in which rotation at axes A1, A4 and A5 is driven by hydraulic motors, hydraulic pistons assemblies, and the like.

FIGS. 13A, 13B and 13C thus illustrate, with additional reference to FIG. 6, that in currently preferred embodiments, rotation of swivel joint embodiment 500B by slew drive 800(R4) enables rotation of stinger assembly 600 about axis A4. In illustrated embodiments, fixed portion 801 on slew drive 800(R4) connects rigidly to second housing piece 526 of swivel joint 500B via conventional fasteners, for example. Rotating portion 802 on slew drive 800(R4) connects rigidly to clamp assembly 400 via bracket 810. Conventional fasteners may connect rotating portion 802 to bracket 810, and connect bracket 810 to clamp assembly 400. In some embodiments, bracket 810 may share fasteners 408 with clamp assembly 400. Worm drive 803 on slew drive 800(R4) thus rotates integral pin 525 and second elbow 536 on swivel joint 500B via connection of rotating portion 802 to clamp assembly 400. Rotary encoder R4, deployed in association with worm drive 803, measures a current rotational position for swivel joint 500B about axis A4 so as to establish a current directional bearing B4 about axis A4. Rotary encoder R4 then transmits the current directional bearing B4 in real time to storage, memory and/or a data processing unit as a data element used in overall control of FDU 100.

FIGS. 13A, 13B and 13C further illustrate, with additional reference to FIG. 6, that in currently preferred embodiments, rotation of swivel joint embodiment 500A by slew drive 800(R5) enables rotation of stinger assembly 600 about axis A5. In illustrated embodiments, fixed portion 801 on slew drive 800(R5) connects rigidly to second housing piece 506 of swivel joint 500A via conventional fasteners, for example. Rotating portion 802 on slew drive 800(R5) connects rigidly to nightcap bracket flange 1007 on nightcap bracket 1005. In preferred embodiments, nightcap bracket 1005 attaches to second elbow 508 on swivel joint 500A. Such attachment may be via conventional fasteners threaded into bosses provided in the exterior wall of second elbow 508, as illustrated on FIG. 13A, for example. The scope of this disclosure is not limited in this regard. Worm drive 803 on slew drive 800(R5) thus rotates swivel collet 505 and second elbow 508 on swivel joint 500A via connection of rotating portion 802 ultimately to second elbow 508. Rotary encoder R5, deployed in association with worm drive 803, measures a current rotational position for swivel joint 500A about axis A5 so as to establish a current directional bearing B5 about axis A5. Rotary encoder R5 then transmits the current directional bearing B5 in real time to storage, memory and/or a data processing unit as a data element used in overall control of FDU 100.

Nightcap 1000

Figure 14B:
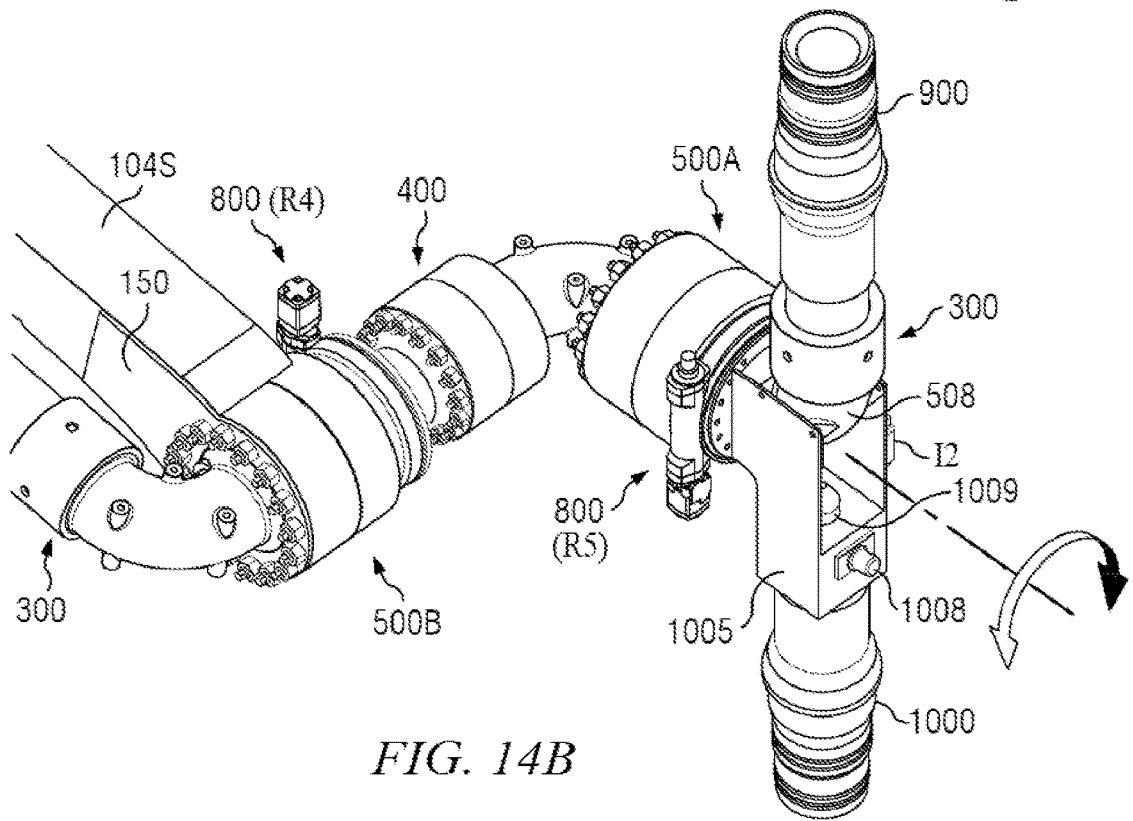
Figure 14C:
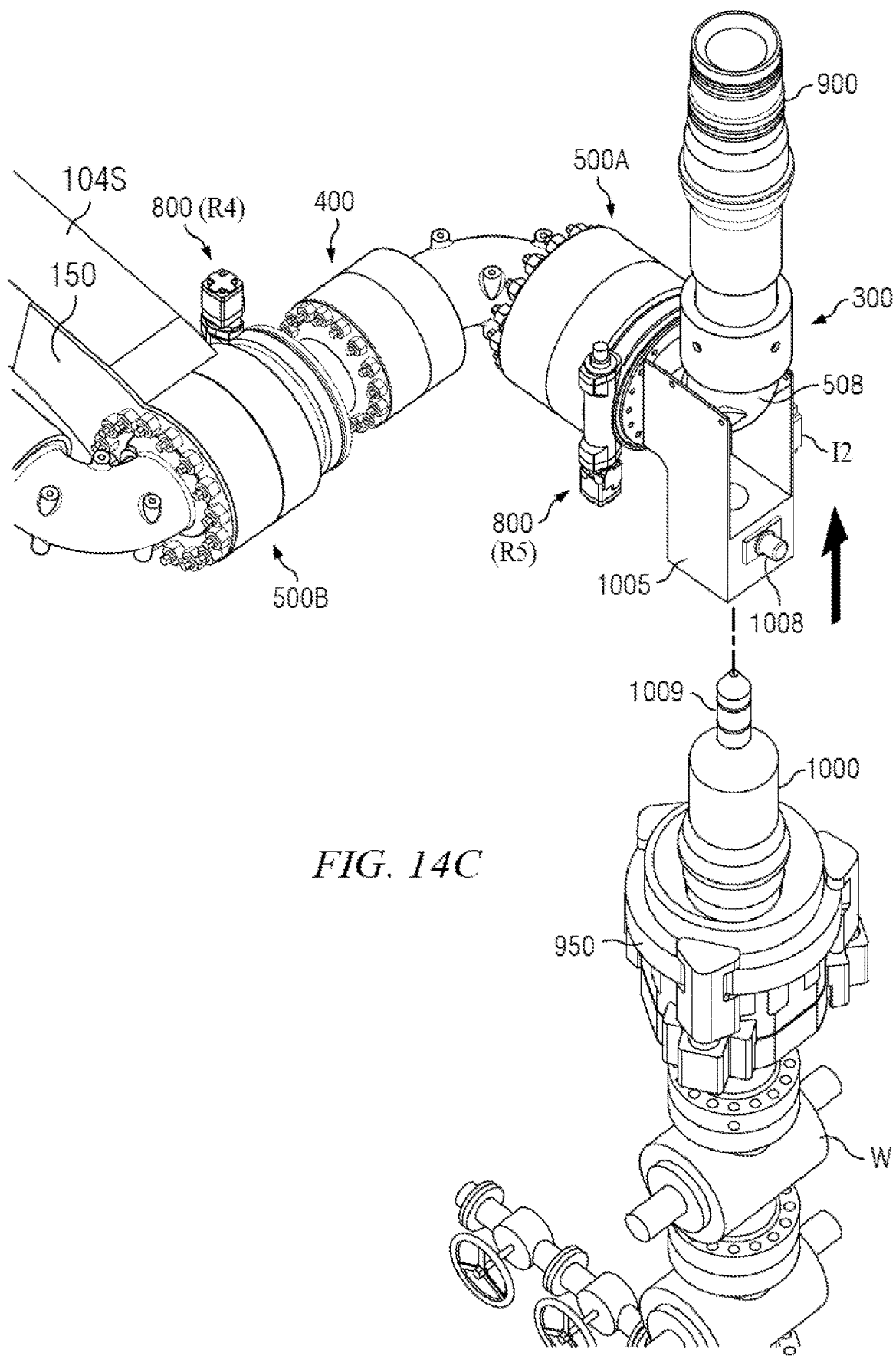

FIGS. 14A, 14B and 14C illustrate a currently preferred embodiment of nightcap 1000 and its associated features, plus the deployment and operation thereof. Embodiments of nightcap 1000 described in this disclosure should be considered optional in conjunction with embodiments of FDU 100 herein. The scope of this disclosure is not limited as to whether or not FDU 100 embodiments include embodiments of nightcap 1000.

FIG. 14A illustrates nightcap 1000 positioned longitudinally opposed to fluid connection adapter 900 on stinger assembly 600. While preferred embodiments position nightcap 1000 longitudinally opposed to fluid connection adapter 900, the scope of this disclosure is not limited in this regard. Nightcap engage/release mechanism 1008 includes an engagement receptacle for holding nightcap 1000 by nightcap engagement pin 1009 (engagement receptacle not specifically illustrated, refer FIG. 14C for nightcap engagement pin 1009). FIG. 14A shows nightcap engage/release mechanism 1008 deployed within nightcap bracket 1005. In preferred embodiments, nightcap bracket 1005 attaches to second elbow 508 on swivel joint embodiment 500A at axis A5 (refer momentarily to FIG. 6). Such attachment may be as illustrated on FIG. 14B, by conventional fasteners threaded into bosses provided in the exterior wall of second elbow 508. The scope of this disclosure is not limited in this regard. FIG. 13C illustrates preferred embodiments of nightcap bracket 1005 also including nightcap bracket flange 1007 for fastener attachment to rotating portion 802 of slew drive 800(R5) at axis A5. Such flange attachment is also shown on FIGS. 14A, 14B and 14C but not called out by part number. Such flange attachment strengthens nightcap bracket 1005's overall attachment.

It will be further appreciated from FIGS. 14A, 14B and 14C that nightcap 1000 and fluid connection adapter 900 are similar in that both are configured to be received and remotely locked into fluid connection housing assembly 950. Refer above to FIG. 4 and associated disclosure for discussion of preferred embodiments of fluid connection adapter 900 and fluid connection housing assembly 950. Refer also, for example, to commonly-assigned U.S. Nonprovisional Patent Application "Remotely Operated Fluid Connection And Seal", Ser. No. 16/221,279 (referred to herein as the "'279 Disclosure"). The '279 Disclosure is incorporated herein by reference. The following description of nightcap 1000 and fluid connection adapter 900 generally follows and is consistent with the disclosure of FIGS. 3 and 4 of the '279 Disclosure, and paragraphs 0048 and 0049 of the '279 Disclosure. Nightcap 1000 and fluid connection adapter 900 are alternative adapter embodiments. Fluid connection adapter 900 provides an open connection to enable flow into (or out of) the wellhead W when fluid connection adapter 900 is received into fluid connection housing assembly 950. By contrast, nightcap 1000 provides a blank or closed-off end to enable temporary closure of the wellhead W while nightcap 1000 is received into fluid connection housing assembly 950. It will thus be appreciated from FIGS. 14A, 14B and 14C that nightcap 1000 and fluid connection adapter 900 each share a common configuration at the distal ends thereof (the distal ends to be received into fluid connection housing assembly 950). In this way, such common configuration allows nightcap 1000 and fluid connection adapter 900 to be interchangeable when received into fluid connection housing assembly 950. It will be further appreciated from reference to FIG. 4 and associated disclosure that nightcap 1000 and fluid connection adapter 900 preferably each share a common configuration from among embodiments disclosed in the Preferred Fluid Connection Designs (as that term is defined above with reference to FIG. 4), although the scope of this disclosure is not limited to the common configuration that nightcap 1000 and fluid connection adapter 900 might share.

FIGS. 14A, 14B and 14C also illustrate deployment and operation of nightcap 1000. As described above, FIG. 14A depicts, in preferred embodiments, nightcap 1000 positioned longitudinally opposed to fluid connection adapter 900. In such embodiments, nightcap 1000 assumes a rest position pointing generally upwards while fluid connection adapter 900 points generally downwards during fluid delivery mode. When nightcap 1000 is desired to be deployed at a selected wellhead, the arrow on FIG. 14B shows that slew drive 800(R5) at axis A5 may be operated to rotate nightcap bracket 1005 so that nightcap 1000 and fluid connection adapter 900 are inverted. Thus, consistent with FIG. 14B, rotation of nightcap bracket 1005 brings nightcap 1000 into position to be inserted into fluid connection housing assembly 950 on a selected wellhead.

FIG. 14C depicts nightcap 1000 previously brought to a selected wellhead W and inserted and locked into fluid connection housing assembly 950 on the selected wellhead W. In preferred embodiments, such insertion and locking may be according to corresponding disclosure in the '279 Disclosure, incorporated herein by reference. Nightcap engage/release mechanism 1008 may then be actuated to release nightcap bracket 1005 from nightcap 1000 by releasing nightcap engagement pin 1009 from the engagement receptacle within nightcap engage/release mechanism 1008. As shown by the arrow on FIG. 14C, once nightcap bracket 1005 is released from nightcap 1000, nightcap bracket 1005 may be raised from nightcap 1000. As described elsewhere in this disclosure, nightcap engage/release mechanism 1008 is preferably actuated remotely from controller 200 (refer FIGS. 7 and 8 herein and associated disclosure, for example), although the scope of this disclosure is not limited to remote actuation of nightcap engage/release mechanism 1008.

Although not specifically illustrated herein, engagement and pickup of nightcap 1000 from fluid connection housing assembly 950 at a selected wellhead is generally the reverse operation to its deployment as described immediately above. Nightcap bracket 1005 may be brought down onto nightcap 1000 so that nightcap engagement pin 1009 is received into the engagement receptacle within nightcap engage/release mechanism 1008. Nightcap engage/release mechanism 1008 may then be actuated to engage nightcap engagement pin 1009. Nightcap 1000 may then be unlocked and released from fluid connection housing assembly 950. In preferred embodiments, such unlocking and release from fluid connection housing assembly 950 may be according to corresponding disclosure in the '279 Disclosure, incorporated herein by reference. Once nightcap 1000 is unlocked and released from fluid connection housing assembly 950, nightcap bracket 1005 may be raised from fluid connection housing assembly 950 with nightcap 1000 attached. Nightcap engage/release mechanism 1008 is again preferably actuated remotely from controller 200 (refer FIGS. 7 and 8 herein and associated disclosure, for example), although the scope of this disclosure is not limited to remote actuation of nightcap engage/release mechanism 1008.

Wall Thickness Monitoring of Fluid-Bearing Pipe and Fittings

It will be appreciated that services and applications for which FDU 100 is designed include delivery of fluids that may be abrasive or corrosive to delivery pipe and fittings. Just by way of example, fracking fluids known in the art may contain solids that cause internal abrasion to delivery pipe and fittings when delivered at operational delivery pressures and volumes (speeds). Further, fracking fluids known in the art may contain ingredients that while beneficial to fracking operations, may also be internally corrosive to delivery pipe and fittings.

In such services and applications, therefore, it is advantageous to monitor wall thickness of delivery piping and fittings in selected regions and locations, where such selected regions and locations are at risk of loss of wall thickness during service. Preferably, such wall thickness monitoring is in real time, although the scope of this disclosure is not limited in this regard.

Figure 15:
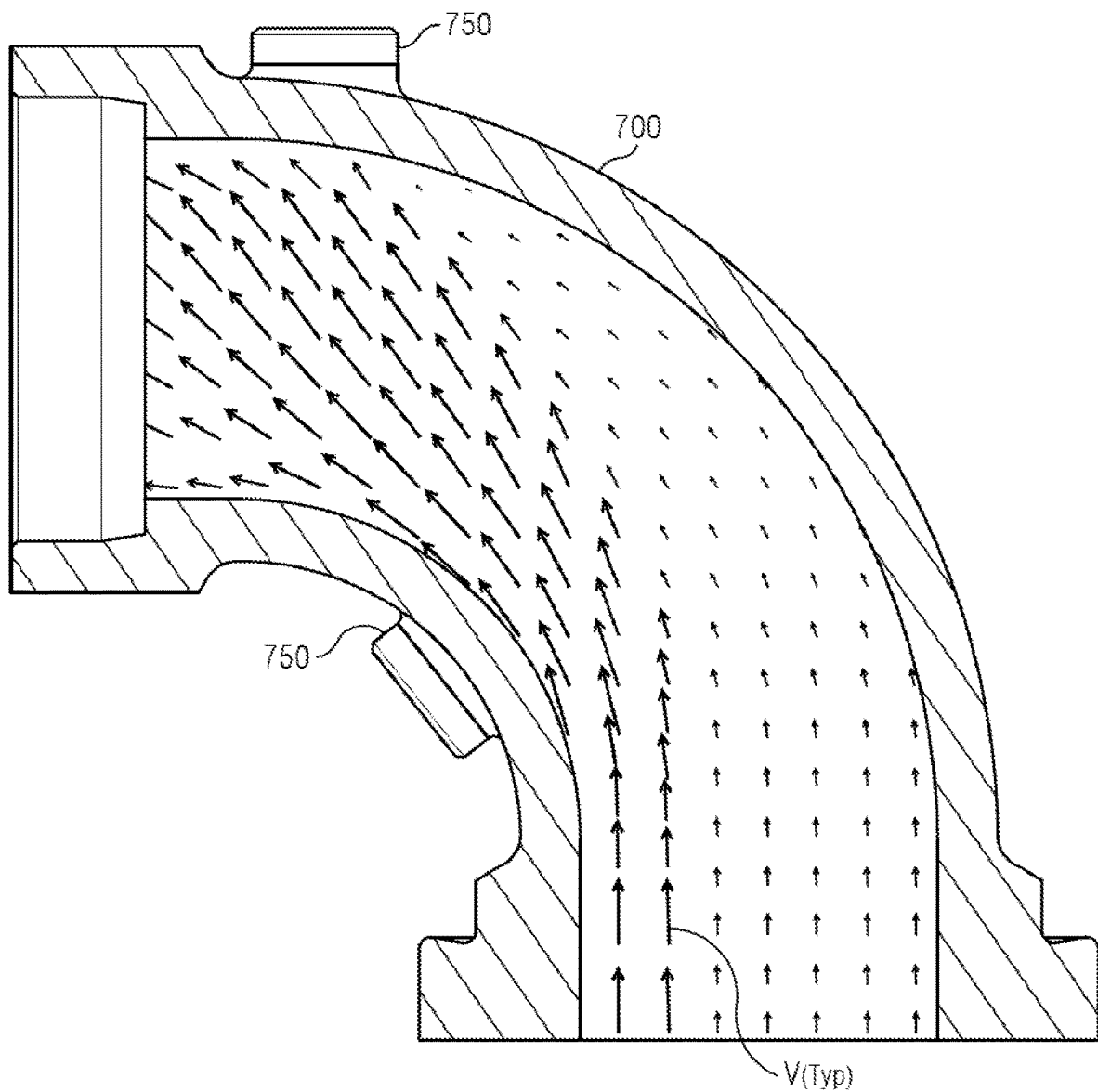
FIG. 15 is a schematic generally illustrating wall thickness monitoring according to this disclosure.

FIG. 15 is a schematic generally illustrating wall thickness monitoring according to this disclosure. FIG. 15 depicts a section through fluid-bearing pipe or fitting 700. The schematic of FIG. 15 illustrates fluid-bearing pipe or fitting 700 generically with exemplary depiction of a conventional elbow fitting. However, the use of an elbow fitting on FIG. 15 is exemplary only, and fluid-bearing pipe or fitting 700 may be any fluid-bearing fitting or length of fluid-bearing pipe, and the scope of this disclosure is not limited in this regard.

FIG. 15 further illustrates fluid flow vectors V within fluid bearing pipe or fitting 700. The schematic of FIG. 15 uses a convention in which fluid flow vectors V depict expected directions of flow, and in which larger fluid flow vectors V represent expected areas of faster flow. The overall fluid flow pattern depicted by fluid flow vectors V on FIG. 15 would be expected by those of ordinary skill in the art, in that, at least with respect to the depicted elbow fitting, faster flow is expected near the inside turn and then towards the outside inner wall.

As noted above, faster flow of abrasive or corrosive fluids (such as commonly seen in fracking operations, for example) suggests that, at least with respect to the elbow fitting depicted on FIG. 15, wall thickness of the fitting may be expected to be at risk of loss near the inside turn and on the outside inner wall after the turn. FIG. 15 depicts wall thickness sensors 750 deployed on the outside of fluid-bearing pipe or fitting 700 at these locations. Wall thickness sensors 750 are conventional, and may send wall thickness information periodically to conventional data processing equipment such as computers or digital monitors. Such data processing equipment may alert users that the wall thickness at the sensed locations has been lost to a point where fluid-bearing pipe or fitting 700 no longer has sufficient wall thickness to carry fluid safely at desired operating pressures and flows. Suitable embodiments of wall thickness sensors 750 may include products available from Dakota Ultrasonics Corporation of Scotts Valley, Calif., U.S.A., although the scope of this disclosure is not limited in this regard.

In other embodiments, this disclosure further describes a method for delivering fluid, the method comprising the steps of:

(a) providing a fluid delivery unit (FDU), comprising: a turret and a stinger assembly separated by first and second boom sections in which the boom sections are concatenated via a rotatable connection; a fluid inlet; a fluid connection adapter deployed on the stinger assembly; and a plurality of swivel joints, wherein the fluid inlet, the swivel joints and the fluid connection adapter are in fluid flow communication along a FDU fluid pathway; wherein: (1) each boom section has a turret end and a stinger end; (2) the turret end of the first boom section is rotatably connected to the turret; and (3) the stinger end of the second boom section is rotatably connected to the stinger assembly; wherein rotation of the turret defines rotation about an axis A1 on a directional bearing B1; wherein rotation of the turret end of the first boom section about the turret defines rotation about an axis A2 on a directional bearing B2; wherein rotation of the turret end of the second boom section about the stinger end of the first boom section defines rotation about an axis A3 on a corresponding directional bearing B3; wherein rotation of the stinger assembly about the stinger end of the second boom section defines rotation about an axis A4 on a corresponding directional bearing B4; wherein the stinger assembly is further configured to rotate about an axis A5 on a corresponding directional bearing B5; wherein the FDU further includes a plurality of rotary encoders R[1 . . . 5], one rotary encoder deployed at each of a corresponding one of axes A[1 . . . 5] such that each rotary encoder is configured to measure a corresponding one of directional bearings B[1 . . . 5] to establish sets of measured bearings values $B_{VAL}[1 . . . 5]$;

(b) selectively moving ones of the turret, the boom sections and the stinger assembly to position the FDU in a first selected spatial position relative to a first fluid connection housing assembly;

(c) storing a first set of $B_{VAL}[1 \ldots 5]$ corresponding to the first spatial position;

(d) connecting the fluid connection adapter to the first fluid connection housing assembly;

(e) commencing fluid flow to the fluid inlet such that fluid flows into the first fluid connection assembly via the FDU fluid pathway;

(f) terminating fluid flow to the fluid inlet;

(g) disconnecting the fluid connection adapter from the first fluid connection housing assembly;

(h) selectively moving ones of the turret, the boom sections and the stinger assembly to position the FDU in a second selected spatial position; and (i) recalling the first set of $B_{VAL}[1 \ldots 5]$; wherein responsive to step (i), the FDU moves robotically to return the first spatial position.

In some method embodiments, each swivel joint may have an internal diameter of not less than about 7 inches, and each swivel joint may be further capable of retaining an internal pressure of not less than about 7,500 psi. In such method embodiments, each swivel joint may be further capable of rotation while retaining an internal pressure of not less than about 7,500 psi. In such method embodiments, step (e) preferably includes commencing fluid flow to the fluid inlet at a fluid pressure not less than about 7,500 psi.

In other method embodiments, each swivel joint may have an internal diameter of not less than about 7 inches, and each swivel joint may be further capable of retaining an internal pressure of not less than about 10,000 psi. In such method embodiments, each swivel joint may be further capable of rotation while retaining an internal pressure of not less than about 10,000 psi. In such method embodiments, step (e) preferably includes commencing fluid flow to the fluid inlet at a fluid pressure not less than about 10,000 psi.

In other method embodiments, each swivel joint may have an internal diameter of not less than about 7 inches, and each swivel joint may be further capable of retaining an internal pressure of not less than about 15,000 psi. In such embodiments, each swivel joint may be further capable of rotation while retaining an internal pressure of not less than about 15,000 psi. In such method embodiments, step (e) preferably includes commencing fluid flow to the fluid inlet at a fluid pressure not less than about 15,000 psi.

Although the material in this disclosure has been described in detail along with some of its technical advantages, it will be understood that various changes, substitutions and alternations may be made to the detailed embodiments without departing from the broader spirit and scope of such material as set forth in the following claims.

We claim:

1. A spatially positioned assembly, comprising:
    a fluid inlet in fluid flow communication with a fluid connection adapter;
    a swivel joint, the swivel joint having an internal diameter of not less than about 5 inches and further capable of rotation while retaining an internal pressure of not less than about 10,000 psi, wherein the swivel joint is interposed in said fluid flow communication between the fluid inlet and the fluid connection adapter; and
    a turret, the turret connected with the fluid connection adaptor via at least one boom section; $S[1 \ldots N]$ where $N \geq 1$, in which each boom section has a proximal end and a distal end, wherein the proximal end of boom section $S[1]$ is rotatably connected to the turret and the distal end of boom section $S[N]$ is rotatably connected with the fluid connection adapter;
    wherein rotation of the turret defines rotation about an axis $A[1]$;
    wherein rotation of the proximal end of boom section $S[1]$ about the turret defines rotation about an axis $A[2]$;
    wherein rotation of the fluid connection adapter about the distal end of boom section $S[N]$ in at least one axis defines rotation about an axis $A[N+2]$; and
    wherein operator control over rotation about axes $A[1 \ldots N+2]$ establishes corresponding desired spatial positions for the spatially positioned assembly.

2. The spatially positioned assembly of claim 1, in which $N=2$.

3. The spatially positioned assembly of claim 1, in which the distal end of boom section $S[N]$ is rotatably connected with the fluid connection adapter via Q independently rotatable axes $A[N+2 \ldots N+1+Q]$ wherein $Q \geq 2$, and in which operator control over rotation about axes $A[1 \ldots N+1+Q]$ establishes corresponding desired spatial positions for the spatially positioned assembly.

4. The spatially positioned assembly of claim 2, in which the distal end of boom section $S[2]$ is rotatably connected with the fluid connection adapter via Q independently rotatable axes $A[4 \ldots Q+3]$ wherein $Q \geq 2$, and in which operator control over rotation about axes $A[1 \ldots 5]$ establishes corresponding desired spatial positions for the spatially positioned assembly.

5. The spatially positioned assembly of claim 4, in which $Q=2$ such that the distal end of boom section $S[2]$ is rotatably connected with the fluid connection adapter via two independently rotatable axes $A[4 \ldots 5]$, and in which operator control over rotation about axes $A[1 \ldots 5]$ establishes corresponding desired spatial positions for the spatially positioned assembly.

6. The spatially positioned assembly of claim 1, in which a selected one of (a) a slew drive or (b) a piston is configured to actuate rotation about at least one of axes $A[1 \ldots N+2]$.

7. The spatially positioned assembly of claim 2, in which the distal end of boom section $S[2]$ is rotatably connected with the fluid connection adapter via Q independently rotatable axes $A[4 \ldots Q+3]$ wherein $Q \geq 2$, and in which operator control over rotation about axes $A[1 \ldots Q+3]$ establishes corresponding desired spatial positions for the spatially positioned assembly.

8. The spatially positioned assembly of claim 1, in which an inclinometer is configured to maintain the fluid connection adapter in a constant plumb vertical attitude during motion of the spatially positioned assembly.

9. The spatially positioned assembly of claim 1, in which the swivel joint has an internal diameter of not less than about 7 inches.

10. A spatially positioned assembly, comprising:
    a fluid inlet in fluid flow communication with a fluid connection adapter;
    a superstructure, the superstructure ultimately connected with the fluid connection adapter such that operator control establishes desired spatial positions for the fluid connection adapter with respect to the superstructure; and
    a swivel joint, the swivel joint having an internal diameter of not less than about 5 inches and further capable of rotation while retaining an internal pressure of not less than about 10,000 psi, wherein the swivel joint is interposed in said fluid flow communication between the fluid inlet and the fluid connection adapter.

11. The spatially positioned assembly of claim 10, in which the superstructure is ultimately connected with the fluid connection adapter via at least one boom section.

12. The spatially positioned assembly of claim 10, in which the superstructure includes a turret, and in which the turret is ultimately connected with the fluid connection adapter.

13. The spatially positioned assembly of claim 12, in which the turret is ultimately connected with the fluid connection adapter via at least one boom section.

14. The spatially positioned assembly of claim 10, in which an inclinometer is configured to maintain the fluid connection adapter in a constant plumb vertical attitude during motion of the spatially positioned assembly.

15. The spatially positioned assembly of claim 10, in which said operator control refers to measurements from at least one axis position measuring device deployed on the spatially positioned assembly.

16. The spatially positioned assembly of claim 10, in which the swivel joint has an internal diameter of not less than about 7 inches.

17. A swivel joint, comprising:
a swivel joint, the swivel joint having an internal diameter of not less than about 5 inches, and wherein the swivel joint is further capable of rotation while retaining an internal pressure of not less than about 10,000 psi.

18. The swivel joint of claim 17, further comprising:
a first elbow, an annular lip formed on the first elbow, a first housing piece received over the first elbow and retained by the annular lip;
a second elbow, an exterior threaded pin surface formed on the second elbow, a second housing piece received over the second elbow;
a swivel collet, wherein swivel collet threads on the swivel collet threadably engage with the threaded pin surface such that the second housing piece is retained by the swivel collet;
first and second rotary bearings separated by the swivel collet such that the first housing piece is received over the second rotary bearing and the second housing piece is received over the first rotary bearing, wherein rigid connection of the first and second housing pieces allows independent differential rotation between the first and second elbows about the first and second rotary bearings.

19. The swivel joint of claim 17, further comprising:
a first elbow, an annular lip formed on the first elbow, a first housing piece received over the first elbow and retained by the annular lip;
an integral pin, an annular rib formed on a proximal end of the integral pin, a second housing piece received over the integral pin and retained by the annular rib;
first and second rotary bearings separated by the annular rib such that the first housing piece is received over the second rotary bearing and the second housing piece is received over the first rotary bearing, wherein rigid connection of the first and second housing pieces allows independent differential rotation between the first elbow and the integral pin about the first and second rotary bearings.

20. The swivel joint of claim 19, in which a second elbow is rigidly connected to a distal end of the integral pin.

21. The swivel joint of claim 17, in which the swivel joint has an internal diameter of not less than about 7 inches.

22. A spatially positioned assembly, comprising:
a fluid inlet in fluid flow communication with a fluid connection adapter;
a swivel joint, the swivel joint having an internal diameter of not less than about 5 inches and further capable of rotation while retaining an internal pressure of not less than about 10,000 psi, wherein the swivel joint is interposed in said fluid flow communication between the fluid inlet and the fluid connection adapter; and
a turret, the turret connected with the fluid connection adaptor via at least one boom section; S[1 . . . N] where N≥1, in which each boom section has a proximal end and a distal end, wherein the proximal end of boom section S[1] is rotatably connected to the turret and the distal end of boom section S[N] is rotatably connected with the fluid connection adapter;
wherein rotation of the turret defines rotation about an axis A[1] on a directional bearing B[1];
wherein rotation of the proximal end of boom section S[1] about the turret defines rotation about an axis A[2] on a directional bearing B[2];
wherein rotation of the fluid connection adapter about the distal end of boom section S[N] in at least one axis defines rotation about an axis A[N+2] on a directional bearing B[N+2];
wherein the spatially positioned assembly further includes at least X axis position measuring devices R[1 . . . X] where N+2≥X≥1, each axis position measuring device deployed at a selected measured axis among A[1 . . . N+2] such that each axis position measuring device is configured to measure a corresponding one of directional bearings B[1 . . . N+2] at the axis A[1 . . . N+2] where deployed; and
wherein the axis position measuring devices R[1 . . . X] establish measured directional bearings values $B_{VAL}[1 . . . X]$, wherein $B_{VAL}[1 . . . X]$ contribute to defining corresponding spatial positions for the spatially positioned assembly.

23. The spatially positioned assembly of claim 22, in which the swivel joint has an internal diameter of not less than about 7 inches.

24. The spatially positioned assembly of claim 22, in which the spatially positioned assembly is configured to display data from at least one measured directional bearing value from among current $B_{VAL}[1 . . . X]$.

25. The spatially positioned assembly of claim 22, in which processing of measured directional bearing values from among $B_{VAL}[1 . . . X]$ enables the spatially positioned assembly to maintain the fluid connection adapter in a constant plumb vertical attitude during motion of the spatially positioned assembly.

26. The spatially positioned assembly of claim 24, in which processing of measured directional bearing values from among $B_{VAL}[1 . . . X]$ enables the spatially positioned assembly to maintain the fluid connection adapter in a constant plumb vertical attitude during motion of the spatially positioned assembly.

27. The spatially positioned assembly of claim 22, in which the spatially positioned assembly is configured to store and recall sets of measured directional values from among $B_{VAL}[1 . . . X]$.

28. The spatially positioned assembly of claim 27, in which the spatially positioned assembly is further configured to robotically take up a corresponding spatial position when directed to recall a set of measured directional bearing values from among previously-stored $B_{VAL}[1 . . . X]$.

29. The spatially positioned assembly of claim 22, in which at least one of the plurality of axis position measuring devices R[1 . . . X] is a rotary encoder.

30. The spatially positioned assembly of claim 22, in which an inclinometer is configured to maintain the fluid connection adapter in a constant plumb vertical attitude during motion of the spatially positioned assembly.

* * * * *

UNITED STATES PATENT AND TRADEMARK OFFICE
CERTIFICATE OF CORRECTION

PATENT NO. : 11,662,747 B2
APPLICATION NO. : 17/233274
DATED : May 30, 2023
INVENTOR(S) : Matthew E. Kibler et al.

Page 1 of 1

It is certified that error appears in the above-identified patent and that said Letters Patent is hereby corrected as shown below:

In the Specification

At Column 24, Line 8, "second inclinometer 12" should read --second inclinometer I2--.

At Column 24, Lines 9-10, "second inclinometer 12" should read --second inclinometer I2--.

At Column 24, Line 13, "second inclinometer 12" should read --second inclinometer I2--.

At Column 24, Line 17, "second inclinometer 12" should read --second inclinometer I2-- in two places.

At Column 24, Line 20, "second inclinometer 12" should read --second inclinometer I2--.

At Column 24, Line 25, "second inclinometer 12" should read --second inclinometer I2--.

At Column 24, Line 28, "second inclinometer 12" should read --second inclinometer I2--.

At Column 24, Line 33, "second inclinometer 12" should read --second inclinometer I2--.

At Column 24, Line 38, "second inclinometer 2" should read --second inclinometer I2--.

At Column 24, Line 44, "second inclinometer 2" should read --second inclinometer I2--.

Signed and Sealed this
First Day of August, 2023

Katherine Kelly Vidal
*Director of the United States Patent and Trademark Office*